(12) United States Patent
Nixon et al.

(10) Patent No.: US 11,424,865 B2
(45) Date of Patent: Aug. 23, 2022

(54) VARIABLE-LEVEL INTEGRITY CHECKS FOR COMMUNICATIONS IN PROCESS CONTROL ENVIRONMENTS

(71) Applicant: FISHER-ROSEMOUNT SYSTEMS, INC., Round Rock, TX (US)

(72) Inventors: Mark J. Nixon, Round Rock, TX (US); Gary K. Law, Georgetown, TX (US); Andrew E. Cutchin, Killeen, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 0 days.

(21) Appl. No.: 17/117,814

(22) Filed: Dec. 10, 2020

(65) Prior Publication Data
US 2022/0190962 A1     Jun. 16, 2022

(51) Int. Cl.
| H04L 1/18 | (2006.01) |
| H04L 1/16 | (2006.01) |
| H04L 1/24 | (2006.01) |
| H04L 1/00 | (2006.01) |

(52) U.S. Cl.
CPC .......... *H04L 1/1642* (2013.01); *H04L 1/0057* (2013.01); *H04L 1/24* (2013.01)

(58) Field of Classification Search
None
See application file for complete search history.

(56) References Cited

U.S. PATENT DOCUMENTS

| 3,849,056 | A | 11/1974 | Schuss |
| 4,410,329 | A | 10/1983 | Blevins et al. |
| 4,598,355 | A | 7/1986 | Shepler et al. |
| 4,628,435 | A | 12/1986 | Tashiro et al. |
| 4,736,320 | A | 4/1988 | Bristol |
| 4,816,647 | A | 3/1989 | Payne |
| 4,827,423 | A | 5/1989 | Beasley et al. |

(Continued)

FOREIGN PATENT DOCUMENTS

| DE | 29824256 U1 | 6/2001 |
| DE | 10247520 A1 | 4/2004 |

(Continued)

OTHER PUBLICATIONS

U.S. Appl. No. 17/078,935, Activating Trip Functions of a Safety Valve Positioner by Way of a Control Panel to Achieve a Safe State, filed Oct. 23, 2020.

(Continued)

*Primary Examiner* — Mujtaba M Chaudry
(74) *Attorney, Agent, or Firm* — Marshall, Gerstein & Borun LLP

(57) ABSTRACT

The described methods and systems enable process control devices to transmit and receive device variable values in a manner that enables the receiving device to verify the integrity of the received values on a variable-by-variable basis. To facilitate verification of integrity, any desired number of variables in a message may have a data integrity check in the message. For each received value that has a data integrity check, the receiving device can calculate its own data integrity check based on the received value and a seed (known to both the transmitting and receiving devices), which it can then compare to the received data integrity check to verify if the received value has been altered during communication.

34 Claims, 7 Drawing Sheets

(56) References Cited

U.S. PATENT DOCUMENTS

| | | | |
|---|---|---|---|
| 4,885,717 A | 12/1989 | Beck et al. | |
| 4,972,328 A | 11/1990 | Wu et al. | |
| 5,014,208 A | 5/1991 | Wolfson | |
| 5,051,898 A | 9/1991 | Wright et al. | |
| 5,146,401 A | 9/1992 | Bansal et al. | |
| 5,168,441 A | 12/1992 | Onarheim et al. | |
| 5,195,098 A | 3/1993 | Johnson et al. | |
| 5,321,829 A | 6/1994 | Zifferer | |
| 5,339,430 A | 8/1994 | Lundin et al. | |
| 5,420,397 A | 5/1995 | Weiss et al. | |
| 5,485,600 A | 1/1996 | Joseph et al. | |
| 5,485,620 A | 1/1996 | Sadre et al. | |
| 5,509,116 A | 4/1996 | Hiraga et al. | |
| 5,530,643 A | 6/1996 | Hodorowski | |
| 5,535,331 A * | 7/1996 | Swoboda | G01R 31/318342 712/E9.016 |
| 5,539,906 A | 7/1996 | Abraham et al. | |
| 5,546,301 A | 8/1996 | Agrawal et al. | |
| 5,553,237 A | 9/1996 | Eisenberg et al. | |
| 5,555,385 A | 9/1996 | Osisek | |
| 5,576,946 A | 11/1996 | Bender et al. | |
| 5,594,858 A | 1/1997 | Blevins | |
| 5,602,993 A | 2/1997 | Stromberg | |
| 5,603,018 A | 2/1997 | Terada et al. | |
| 5,611,059 A | 3/1997 | Benton et al. | |
| 5,631,825 A | 5/1997 | van Weele et al. | |
| 5,649,200 A | 7/1997 | Leblang et al. | |
| 5,768,119 A | 6/1998 | Havekost et al. | |
| 5,812,394 A | 9/1998 | Lewis et al. | |
| 5,838,563 A | 11/1998 | Dove et al. | |
| 5,864,657 A | 1/1999 | Stiffler | |
| 5,903,897 A | 5/1999 | Carrier, III et al. | |
| 5,940,294 A | 8/1999 | Dove | |
| 5,950,209 A | 9/1999 | Carrier, III et al. | |
| 5,984,504 A | 11/1999 | Doyle et al. | |
| 6,047,129 A | 4/2000 | Frye | |
| 6,078,320 A | 6/2000 | Dove et al. | |
| 6,138,174 A | 10/2000 | Keeley | |
| 6,157,864 A | 12/2000 | Schwenke et al. | |
| 6,161,051 A | 12/2000 | Hafemann et al. | |
| 6,167,316 A | 12/2000 | Gloudeman et al. | |
| 6,314,425 B1 | 11/2001 | Serbinis et al. | |
| 6,381,698 B1 | 4/2002 | Devanbu et al. | |
| 6,385,494 B1 | 5/2002 | Blahnik et al. | |
| 6,385,496 B1 | 5/2002 | Irwin et al. | |
| 6,415,418 B1 | 7/2002 | McLaughlin et al. | |
| 6,438,432 B1 | 8/2002 | Zimmermann et al. | |
| 6,442,512 B1 | 8/2002 | Sengupta et al. | |
| 6,442,515 B1 | 8/2002 | Varma et al. | |
| 6,445,963 B1 | 9/2002 | Blevins et al. | |
| 6,446,202 B1 | 9/2002 | Krivoshein et al. | |
| 6,449,624 B1 | 9/2002 | Hammack et al. | |
| 6,449,715 B1 | 9/2002 | Krivoshein | |
| 6,477,435 B1 | 11/2002 | Ryan et al. | |
| 6,515,683 B1 | 2/2003 | Wright | |
| 6,546,297 B1 | 4/2003 | Gaston et al. | |
| 6,587,108 B1 | 7/2003 | Guerlain et al. | |
| 6,631,476 B1 | 10/2003 | Vandesteeg et al. | |
| 6,647,301 B1 | 11/2003 | Sederlund et al. | |
| 6,647,315 B1 | 11/2003 | Sherriff et al. | |
| 6,684,385 B1 | 1/2004 | 6Ailey et al. | |
| 6,775,707 B1 | 8/2004 | Bennett et al. | |
| 6,915,444 B2 | 7/2005 | Vasko et al. | |
| 6,928,328 B2 | 8/2005 | Deitz et al. | |
| 6,975,966 B2 | 12/2005 | Scott et al. | |
| 6,999,824 B2 | 2/2006 | Glanzer et al. | |
| 7,069,580 B1 | 6/2006 | Deitz et al. | |
| 7,076,312 B2 | 7/2006 | Law et al. | |
| 7,107,358 B2 | 9/2006 | Vasko et al. | |
| 7,237,109 B2 | 6/2007 | Scott et al. | |
| 7,289,861 B2 | 10/2007 | Aneweer et al. | |
| 7,865,251 B2 | 1/2011 | Law et al. | |
| 2002/0013629 A1 | 1/2002 | Nixon et al. | |
| 2002/0138668 A1 | 9/2002 | Heckel | |
| 2003/0014536 A1 | 1/2003 | Christensen et al. | |
| 2004/0059917 A1 | 3/2004 | Powers | |
| 2004/0210326 A1 | 10/2004 | Muneta et al. | |
| 2013/0151891 A1* | 6/2013 | Piry | G06F 11/3058 714/10 |
| 2018/0329780 A1* | 11/2018 | Boettjer | G06F 11/183 |
| 2020/0226586 A1* | 7/2020 | Lu | H04L 9/0894 |
| 2020/0336318 A1* | 10/2020 | Garg | H04L 9/3247 |

FOREIGN PATENT DOCUMENTS

| | | |
|---|---|---|
| EP | 0 276 937 A1 | 8/1988 |
| EP | 0472169 A2 | 2/1992 |
| EP | 0813129 A2 | 12/1997 |
| EP | 1091274 A2 | 4/2001 |
| EP | 1396772 A1 | 3/2004 |
| GB | 2 275 813 A | 9/1994 |
| GB | 2355082 A | 4/2001 |
| GB | 2363872 A | 1/2002 |
| GB | 2377070 A | 12/2002 |
| GB | 2379749 A | 3/2003 |
| JP | 2001202323 A | 7/2001 |
| JP | 2001202324 A | 7/2001 |
| JP | 2001242906 A | 9/2001 |
| JP | 2002099512 A | 4/2002 |
| JP | 2003505984 A | 2/2003 |
| WO | WO-97/49018 A1 | 12/1997 |
| WO | WO-00/65415 A2 | 11/2000 |
| WO | WO-01/14940 A1 | 3/2001 |
| WO | WO-01/46765 A1 | 6/2001 |
| WO | WO-01/90829 A2 | 11/2001 |
| WO | WO-02/097543 A1 | 12/2002 |
| WO | WO-2004/057430 A1 | 7/2004 |

OTHER PUBLICATIONS

Cyber-Physical Systems Laboratory, "WashU WirelessHART" Retrieved from the Internet at: <https://www.cse.wustl.edu/~lu/cse521s/Slides/wirelesshart.pdf> on Jul. 29, 2020.

FORCEmeter, "HART Protocol Guide" Retrieved from the Internet at: <https://www.specialtyproducttechnologies.com/docs/default-source/manuals/niagara-meters/forcemeter-target-meter-hart-protocol-manual.pdf?sfvrsn=5> on Oct. 26, 2020.

Knick Elektronische Messgerate GmbH & Co. KG—HART Communication Protocol, "A211 CC /A411 CC Transmitter Specific HART Command Specification" Retrieved from the Internet at: <https://www.knick-international.com/export/media/13566.pdf> on Oct. 26, 2020.

Swedish Institute of Computer Science, "A Framework for WirelessHART Simulations" Retrieved from the Internet at: <http://www.diva-portal.org/smash/get/diva2:1042693/FULLTEXT01.pdf> on Jul. 27, 2020.

Emerson Manual Supplement, "Incus HART® Field Device Specification" Retrieved from the Internet at: <https://www.emerson.com/documents/automation/manual-incus-hart-field-device-specification-en-5292186.pdf> on Jul. 29, 2020.

Hart Commands, "One Series Device Specific HART Command Details" Retrieved from the Internet at: <https://www.ueonline.com/hart/One%20Series%201XTX%20HART%20Command%20Details.pdf? on Oct. 26, 2020.

Microsemi, "Design of a Safe and Secure Process Control System" Retrieved from the Internet at: <file://mgb02/USERS/gscianni/CitrixXenApp/Downloads/Design_Safe_Sec_Process_Ctrl_Sys%20(7).pdf> on Aug. 4, 2020.

Hart Communication Foundation, "Common Practice Command Specification (HCF_SPEC-151, Revision 8.0" Retrieved from the Internet at: <https://docplayer.net/64736904-Common-practice-command-specification-hcf_ spec-151-revision-8-0.html> on Jul. 29, 2020.

Hart Communication Foundation, "Common Tables Specification (HCF_SPEC-183, Revision 13.0)" Retrieved from the Internet on Oct. 26, 2020.

CSC 8260: Wireless Networking and Cyber Physical Systems, "Chapter 31: WirlessHART" (Written by: Alessandra Flammini and Emiliano Sisinni, University of Brescia), Retrieved from the Internet on Jul. 27, 2020.

(56) References Cited

OTHER PUBLICATIONS

Cyber-Physical Systems Laboratory, "Introduction of WirelessHART (CSE 521S, Fall 2019, Yehan Ma)" Retrieved from the Internet on Jul. 29, 2020.
ODVA, "CIP Safety Protocol Training, Session: 0 Overview of Functional Safety and Safety Networks" Retrieved from the Internet on Oct. 26, 2020.
HART-IP Process Communications Solutions, "Introduction to HART-IP" Retrieved from the Internet on Jul. 27, 2020.
Chemical Engineering Progress, "Leveraging Smart Valve Positioners". Retrieved from the Internet at: <https://www.emerson.com/documents/automation/article-leveraging-smart-valve-positioners-fisher-en-518420.pdf> dated Sep. 18, 2020.
Emerson, "Advantages of Using Linkageless, Non-Contact Feedback Technology in Digital Positioners". Retrieved from the Internet at: <https://www.emerson.com/documents/automation/white-paper-advantages-of-using-linkage-less-non-contact-feedback-technology-in-digital-positioners-fisher-en-135386.pdf> dated Sep. 18, 2020.
Emerson, "Fisher™ FIELDVUE DVC6200 SIS Digital Valve Controller for Safety Instrumented Systems (SIS)". Retrieved from the Internet at: <https://www.emerson.com/documents/automation/product-bulletin-fieldvue-dvc6200-sis-digital-valve-controller-for-safety-instrumented-systems-sis-en-123328.pdf? dated Sep. 18, 2020.
Emerson, "Fisher™ LCP200 Local Control Panel". Retrieved from the Internet at: <https://www.emerson.com/documents/automation/product-bulletin-fisher-lcp200-local-control-panel-en-4180936.pdf> dated Sep. 18, 2020.
Emerson, "Fisher™FIELDVUE™ DVC6200 SIS Digital Valve Controller". Retrieved from the Internet at: <https://www.emerson.com/documents/automation/instruction-manual-fisher-fieldvue-dvc6200-sis-digital-valve-controller-en-122736.pdf> dated Sep. 18, 2020.
Emerson, "Safety manual for Fisher™ FIELDVUE DVC6200 SIS Digital Valve Controller, Position Monitor, and LCP200 Local Control Panel". Retrieved from the Internet at: <https://www.emerson.com/documents/automation/im-supplement-safety-manual-for-fieldvue-dvc6200-sis-digital-valve-controller-position-monitor-lcp200-local-control-panel-en-125602.pdf> dated Sep. 18, 2020.
Ames et al., "Applications of Web-Based Workflow," System Sciences, 79-87 (1998).
Bailey, "Introducing Bailey Evolution 90TM . . . The Sound Investment Strategy for Process Automation," 1993.
Bailey, "Wide-Range, Fully Compatible Family of Process Automation and Management Systems," 1993.
Chan et al., "Software Configruation Management Tools," Software Technology and Engineering Practice, 238-250 (1997).
Computer Products, "Unbundling the DCS", approximately 1992.
Elsag Bailey, Elsag Bailey Automation, approximately 1993.
Fisher-Rosemount, "Managing the Process Better," Dec. 1993.
Fisher-Rosemount, "Managing the Process Better," Sep. 1993.
Honeywell, "Process Manager Specification and Technical Data," Sep. 1991.
Honeywell, "TDC 3000 Overview", approximately 1992.
Honeywell, "TDC 3000 Process Manager", approximately 1992.
Honeywell, "UDC 6000 Process Controller", Aug. 1992.
Leeds and Northrup, "Make Your Automation Plan a Reality: MAX 1000", approximately 1990.
Merant, "Change Management Capabilities," PVCS Dimensions [On-line] Available: http://nsit.uchicago.edu/rpa/documents/configuration/Merant/change_mgnt_capabilities.pdf (2005).
Reliance Electric Company, "Multitasking Capability Simplifies Process Control Design", approximately late 1980's by Angelo J. Notte.
Toshiba, "Toshiba Integrated Control Systems", Nov. 1990.

\* cited by examiner

VARIABLE-LEVEL INTEGRITY CHECKS FOR COMMUNICATIONS IN PROCESS CONTROL ENVIRONMENTS

TECHNICAL FIELD

The present disclosure generally relates to verifying the integrity of communications in a process control environment, and, more particularly, to verifying the integrity of variable values (such as those used in safety systems) in such communications on a variable-by-variable basis to improve the reliability and trustworthiness of the variable values for devices receiving the communications.

BACKGROUND

Distributed process control systems, such as distributed or scalable process control systems like those used in power generation, chemical, petroleum, or other processes, typically include one or more process controllers communicatively coupled to each other, to at least one host or operator workstation via a process control network, and to one or more instrumentation or field devices via analog, digital, or combined analog/digital buses.

The field devices perform functions within the process or plant such as opening or closing valves, switching devices on and off, and measuring process parameters. Example field devices include valves, valve positioners, switches, and transmitters (e.g., devices including sensors for measuring temperature, pressure, or flow rate; and transmitters for transmitting the sensed temperatures, pressures, and flow rates).

The process controllers, which are typically located within the plant environment, receive signals indicative of process measurements made by the field devices (or other information pertaining to the field devices) and execute a controller application that runs, for example, different control modules which make process control decisions, generate control signals based on the received information, and coordinate with the control modules or blocks being implemented in smart field devices (e.g., HART®, WirelessHART®, and FOUNDATION® Fieldbus field devices).

Execution of the control modules causes the process controllers to send the control signals over the communication links or signal paths to the field devices, to thereby control the operation of at least a portion of the process plant or system (e.g., to control at least a portion of one or more industrial processes running or executing within the plant or system). For example, a first set of controller(s) and field devices may control a first portion of a process being controlled by the process plant or system, and a second set of controller(s) and field devices may control a second portion of the process.

Input/output (I/O) cards (sometimes called "I/O devices" or "I/O modules"), which are also typically located within the plant environment, typically are communicatively disposed between a controller and one or more field devices, enabling communications there between (e.g. by converting electrical signals into digital values and vice versa). Typically, an I/O card functions as an intermediary node between a process controller and one or more field devices inputs or outputs configured for the same communication protocol or protocols as those utilized by the I/O card. Specifically, field device inputs and outputs are typically configured for either analog or discrete communications. In order to communicate with a field device, a controller generally needs an I/O card configured for the same type of input or output utilized by the field device. That is, for a field device configured to receive analog control output signals (e.g., a 4-20 mA signal), the controller needs an analog output (AO) I/O card to transmit the appropriate analog control output signal; and for a field device configured to transmit measurements or other information via an analog signal, the controller typically needs an analog input (AI) card to receive the transmitted information. Similarly, for a field device configured to receive discrete control output signals, the controller needs a discrete output (DO) I/O card to transmit the appropriate discrete control output signal; and for a field device configured to transmit information via a discrete control input signal, the controller needs a discrete input (DI) I/O card. Further, some I/O cards are configured for resistance temperature detectors (RTD) (which vary the resistance of a wire with temperature) or thermocouples (TC) (which generate a voltage proportional to a temperature). Generally, each I/O card can connect to multiple field device inputs or outputs, wherein each communication link to a particular input or output is referred to as "an I/O channel" (or, more generically, "channel"). For example, a 120 channel DO I/O card can be communicatively connected to 120 distinct discrete field device inputs via 120 distinct DO I/O channels, enabling the controller to transmit (via the DO I/O card) discrete control output signals to the 120 distinct discrete field device inputs.

As utilized herein, field devices, controllers, and I/O devices are generally referred to as "process control devices," and are generally located, disposed, or installed in a field environment of a process control system or plant. The network formed by one or more controllers, the field devices communicatively connected to the one or more controllers, and the intermediary nodes facilitating communication between the controllers and field devices may be referred to as an "I/O network" or "I/O subsystem."

Information from the I/O network(s) may be made available over a data highway or communication network (the "process control network") to one or more other hardware devices, such as operator workstations, personal computers or computing devices, handheld devices, data historians, report generators, centralized databases, or other centralized administrative computing devices that are typically placed in control rooms or other locations away from the harsher field environment of the plant, e.g., in a back-end environment of the process plant.

The information communicated over the process control network enables an operator or a maintenance person to perform desired functions with respect to the process via one or more hardware devices connected to the network. These hardware devices may run applications that enable an operator to, e.g., change settings of the process control routine(s), modify the operation of the control modules within the process controllers or the smart field devices, view the current state of the process or status of particular devices within the process plant, view alarms generated by field devices and process controllers, simulate the operation of the process for the purpose of training personnel or testing the process control software, diagnose problems or hardware failures within the process plant, etc. The process control network or data highway utilized by the hardware devices, controllers, and field devices may include a wired communication path, a wireless communication path, or a combination of wired and wireless communication paths.

Furthermore, in many processes, a safety system (sometimes called a "safety instrumented system" or "SIS") is provided to detect significant safety related problems within the process plant and to automatically close valves, remove power from devices, switch flows within the plant, etc. when a problem occurs which might result in a serious hazard in the plant, such as a spill of toxic chemicals, an explosion, etc. What a safety system or SIS shall do (the functional requirements) and how well it must perform (the safety integrity requirements) may be determined from hazard and operability studies (HAZOP), layers of protection analysis (LOPA), risk graphs, and so on. Example techniques are mentioned in IEC 61511 and IEC 61508. During safety system or SIS design, construction, installation, and operation, safety personnel typically verify that these requirements are met. The functional requirements may be verified by design reviews, such as failure modes, effects, and criticality analysis (FMECA) and various types of testing (e.g., example factory acceptance testing, site acceptance testing, and regular functional testing).

Generally speaking, a safety system or SIS is engineered to perform "specific control functions" to failsafe or to maintain safe operation of a process when unacceptable or dangerous conditions occur. Typically, a safety system is relatively independent from other control systems in order to ensure safety system functionality is not compromised. A safety system is typically composed of the same types of control elements (including sensors, logic solvers or controllers, actuators and other control equipment) as a Basic Process Control System (BPCS). However, in traditional implementations, the control elements in a safety system are dedicated solely to the proper functioning of the safety system (e.g., rather than proper control of the process controlled by the control system).

Generally, a "Safety Instrumented Function" or "SIF" is a particular set of equipment in a safety system intended to reduce risk associated with a particular hazard, and may be thought of or referred to as a safety system control loop or "safety loop." A SIF is intended to (1) automatically take an industrial process to a safe state when specified conditions are violated; (2) permit a process to move forward in a safe manner when specified conditions allow (permissive functions); or (3) take action to mitigate the consequences of an industrial hazard. A SIF is typically implemented as part of an overall risk reduction strategy that is intended to eliminate the likelihood of a previously identified Safety, Health and Environmental (SH&E) event that could range from minor equipment damage to an event involving an uncontrolled catastrophic release of energy and/or materials.

Typically, each SIF or safety loop is assigned a certain level of protection, defined by the "safety integrity level" or "SIL" (1, 2, 3 or 4), using one of the methodologies defined in IEC 61508/61511 as the "Risk Graph," the "Risk Matrix," or the LOPA. Assignment of SIL is an exercise in risk analysis where the risk associated with a specific hazard, that is intended to be protected against by a SIF, is calculated without the beneficial risk reduction effect of the SIF. That unmitigated risk is then compared against a tolerable risk target. The difference between the unmitigated risk and the tolerable risk, if the unmitigated risk is higher than tolerable, must be addressed through risk reduction of the SIF. This amount of required risk reduction is correlated with the SIL target. In essence, each order of magnitude of risk reduction that is required correlates with an increase in one of the required SIL numbers. In a typical example, SIL-1 represents a risk reduction of up to 100×; SIL-2 represents a risk reduction of up to 1000×; SIL-3 represents a risk reduction of up to 10,000×; and SIL-4 represents a risk reduction of up to 100,000×.

The International Electrotechnical Commission's (IEC) standard IEC 61508 defines SIL using requirements grouped into two broad categories: hardware safety integrity and systematic safety integrity. A device or system generally should meet the requirements for both categories to achieve a given SIL. The SIL requirements for hardware safety integrity are based on a probabilistic analysis of the device. In order to achieve a given SIL, the device typically meet targets for the maximum probability of dangerous failure and a minimum safe failure fraction. Typically, the concept of "dangerous failure" is defined for the system in question, normally in the form of requirement constraints whose integrity is verified throughout system development. The actual targets required vary depending on the likelihood of a demand, the complexity of the device(s), and types of redundancy used.

Regarding communications, IEC61508 standards indicate that safety communications should not exceed 1% of the allowable probability of dangerous failure per hour for the desired SIL. To be acceptable for use in SIL 3 applications, the probably of a dangerous failure due to the safety communications must be less than 10-9 per hour. In short, the ability to verify the integrity of a given piece of information received via a communication can greatly impact whether or not a safety system can rely on the piece of information in a manner conforming to typical safety standards. Said another way, without the ability to verify the integrity of a piece of information, the expected error rate associated with the communication may exceed acceptable thresholds, rendering the information unusable by the safety system.

As noted, safety systems typically have one or more separate logic solvers or controllers (sometimes called "safety controllers"), apart from the process control controllers, which are connected to safety field devices via separate buses or communication lines disposed within the process plant. The safety controllers use the safety field devices to detect process conditions associated with significant events, such as the position of certain safety switches or shutdown valves, overflows or underflows in the process, the operation of important power generation or control devices, the operation of fault detection devices, etc. to thereby detect "events" within the process plant representing abnormal conditions. When an event is detected, the safety controller takes some action to limit the detrimental effect of the event, such as transmitting a command to close one or more valves, deactivate or turn off one or more devices, remove power from sections of the plant, etc.

Note, this background description provides context to facilitate understanding and appreciating the detailed description below. Work of the presently named inventors, to the extent described in this background section (as well as aspects of the background description that may not otherwise qualify as prior art at the time of filing) are neither expressly nor impliedly admitted as prior art against the present disclosure.

SUMMARY

The described methods and systems enable process control devices to transmit and receive device variable values in a manner that enables the receiving device to verify the integrity of the received values on a variable-by-variable basis.

In an embodiment, a method for transmitting messages including values for device variables includes transmitting the messages such that the integrity of the values can be verified on a variable-by-variable basis. The method may comprise any one or more of: detecting, by a first process control device in a process control environment for controlling a process, a detected value for a device variable; calculating, by the process control device, a first data integrity check by way of a performing a data integrity calculation using the detected value and a seed as inputs; encoding a message to include the detected value and the first data integrity check for the detected value; or transmitting the message. Transmitting the message may comprise transmitting the message such that it is receivable by a second process control device configured to: (i) receive the message, (ii) calculate a second data integrity check for a candidate value in the message for the device variable; (iii) update or not update, at the second process control device, a process variable mapped to the device variable with the candidate value based on whether or not the first and second data integrity checks match; and (iv) implement a function as part of a control scheme for the process in accordance with the process variable.

In an embodiment, a system is configured to transmit messages including values for process variables that can be authenticated at the parameter or variable level (e.g., on a variable by variable basis). The system may comprise a first process control device configured to be communicatively coupled to one or more other process control devices in an input/output (I/O) network of a process control environment for controlling a process. The first process control device may include any one or more of: (A) a communication interface configured to couple the field device to the one or more controllers; or (B) a set of circuits communicatively coupled to the communication interface. The set of circuits may be configured to: detect a detected value for a device variable; calculate a first data integrity check by way of performing a data integrity calculation using the detected value and a seed as inputs; encode a message to include the detected value and the first data integrity check for the detected value; or transmit, via the communication interface, the message to a second process control device. The second process control device may be configured to do any one or more of: (i) receive the message, (ii) calculate a second data integrity check for a candidate value in the message for the device variable; (iii) update or not update, at the second process control device, a process variable mapped to the device variable with the candidate value based on whether or not the first and second data integrity checks match; or (iv) implement a function as part of a control scheme for the process in accordance with the process variable.

In an embodiment, a method for verifying the integrity of device variable values included in a message from a process control device may be implemented. The method may comprise any one or more of: (1) receiving a message, transmitted by a first process control device, at a second process control device in a process control environment for controlling a process; (2) decoding the message to identify within the message: (i) a candidate value for a device variable, and (ii) a first data integrity check for the device variable; (3) calculating a second data integrity check by way of a performing a second data integrity calculation using the candidate value and a seed as inputs; (4) comparing the second data integrity check to the first data integrity check to determine whether or not the second data integrity check matches the first data integrity check and to thereby determine whether or not the candidate value matches a detected value that was used to calculate the first data integrity check; (5) responding to determining that the second data integrity check does not match the first data integrity check by discarding the candidate value such that a process variable mapped to the device variable maintains a prior value; (6) responding to determining that the second data integrity check matches the first data integrity check by updating, at the second process control device, the process variable with the candidate value; or (7) implementing, in accordance with the process variable, a function as part of a control scheme for the process.

In an embodiment, a system for verifying the integrity of device variable values included in a message from a process control device may be implemented. The system may comprise a second process control device that is configured to be communicatively coupled to a first process control device in a process control environment. The second process control device may include any one or more of: (A) a communication interface configured to communicatively couple the second process control device to the first process control device; or (B) a set of circuits communicatively coupled to the communication interface. The set of circuits may be configured to: receive, via the communication interface, a message transmitted by the first process control device; decode the message to identify within the message: (i) a candidate value for a device variable, and (ii) a first data integrity check for the device variable; calculate a second data integrity check by way of a performing a second data integrity calculation using the candidate value and a seed as inputs; compare the second data integrity check to the first data integrity check to determine whether or not the second data integrity check matches the first data integrity check and to thereby determine whether or not the candidate value matches a detected value that was used to calculate the first data integrity check; respond to determining that the second data integrity check does not match the first data integrity check by discarding the candidate value such that a process variable mapped to the device variable maintains a prior value; respond to determining that the second data integrity check matches the first data integrity check by updating the process variable with the candidate value; or implementing, in accordance with the process variable, a function as part of a control scheme for the process.

DETAILED DESCRIPTION

The described methods and systems enable process control devices to transmit and receive device variable values in a manner that enables the receiving device to verify the integrity of the received values on a variable-by-variable basis. To facilitate verification of integrity, any desired number of variables in a message may have a data integrity check in the message. For each received value that has a data integrity check, the receiving device can calculate its own data integrity check based on the received value and a seed (known to both the transmitting and receiving devices). For each process variable value for which a mismatch exists between the received and calculated data integrity checks, the receiving device can assume the received value does not match the original transmitted value (and can thus discard the received value). On the other hand, if the received and calculated data integrity checks for a particular device variable match, the receiving device can verify the integrity of the received value (i.e., verify it matches the original transmitted value). As a result, the receiving device can confidently act on the received value (e.g., by updating a local or system-wide process variable corresponding to the device variable, implementing control in accordance with the received value, etc.). By comparison, to the extent traditional systems enable verification of data integrity, they typically do so on a packet basis or message basis. In such a system, a change in any data in the message renders the entire message unverifiable. Thus, if a single device variable value (or any other piece of data) is corrupted after transmission, the receiving devices must discard the entire message (or move forward with values for which it cannot verify the integrity).

As used herein, the term "message" refers to a unit of communication, represented by a set of data, transmitted or received by a node (e.g., via a link). The set of data representing the message may include a payload (i.e., the content intended to be delivered) and protocol overhead. The overhead may include routing information and metadata pertaining to the protocol or payload (e.g., identifying the protocol for the message, the intended recipient node, the originating node, the size of the message or payload, data integrity information for checking the integrity of the message, etc.). In some instances, a packet or sequence of packets may be thought of as a message.

In any event, various techniques, systems, and methods are discussed below with reference to FIGS. 1-7.

I. Example Process Control Environment

Figure 1:
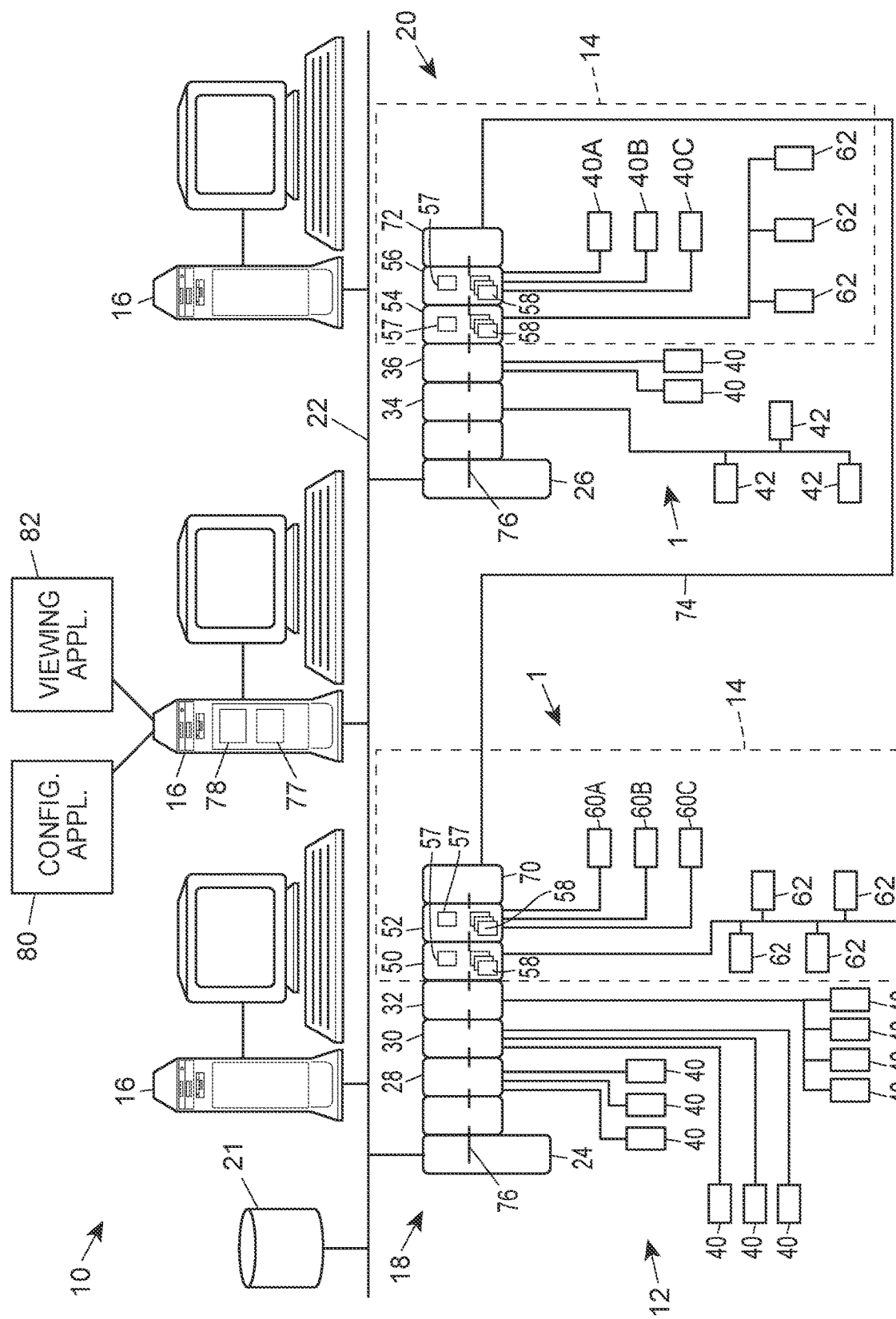
FIG. 1 is a block diagram of an example process control plant in which the described techniques may be implemented.

FIG. 1 depicts a process plant 10 in which each of the shown safety controllers, process controllers, and field devices may be configured (if desired) to transmit and receive messages including variable values in a manner that enables a receiving device to verify the integrity of the received values on a variable-by-variable basis. This improvement to verifying data integrity on a variable-by-variable basis may be especially beneficial to safety systems (such as the one shown in FIG. 1), enabling them to rely on communications carrying variable values that might otherwise be too error-prone for safety system implementations.

As used herein, a "process control device" is any device configured for implementation in the process plant 10 and configured to transmit or receive messages carrying process variables according to one or more protocols implemented at the process plant 10, such that the messages can be received, decoded, and acted on by one or more devices in the process plant 10.

As shown, the process plant or environment 10 includes a process control system 12 integrated with a safety system 14 (indicated by dotted lines), which generally operates as a Safety Instrumented System (SIS) to monitor and override the control provided by the process control system 12 to maximize the likelihood of safe operation of the process plant 10.

A. Example Components of an Example Process Control System and an Example Safety System At a high level, the plant 10 may include a field environment including process control devices (e.g., field devices, controllers, and I/O devices) that are typically located, disposed, or installed in an area where the controlled process is measured and controlled (e.g., the components in the nodes 18 and 20 shown in FIG. 1) and a back-end environment that may include components isolated or removed from the field environment (e.g., in office environments, remote environments, etc.), such as the components 21 and 16 shown in FIG. 1.

More specifically, the process plant 10 includes one or more host workstations, computers or user interfaces 16 (which may be any type of personal computers, workstations, etc.) which are accessible by plant personnel, such as process control operators, maintenance personnel, configuration engineers, etc. In the example illustrated in FIG. 1, three user interfaces 16 are shown as being connected to two separate process control/safety control nodes 18 and 20 and to a configuration database 21 via a common communication line or bus 22. The communication network 22 may be implemented using any desired bus-based or non-bus-based hardware, using any desired hardwired or wireless communication structure and using any desired or suitable communication protocol, such as an Ethernet protocol.

Generally speaking, as used herein and unless otherwise specified, the term "network" refers to a collection of nodes (e.g., devices or systems capable of sending, receiving or forwarding information) and links which are connected to enable telecommunication between the nodes. Depending on the embodiment (and unless otherwise stated), each of the described networks may include dedicated routers, switches, or hubs responsible for forwarding directing traffic between nodes, and, optionally, dedicated devices responsible for configuring and managing the network. Some or all of the nodes in the described networks may be also adapted to function as routers in order to direct traffic sent between other network devices. Nodes of the described networks may be inter-connected in a wired or wireless manner, and may have different routing and transfer capabilities.

Generally speaking, each of the nodes 18 and 20 of the process plant 10 includes both process control system devices and safety system devices connected together via a bus structure that may be provided on a backplane into which the different devices are attached. The node 18 is illustrated in FIG. 1 as including a process controller 24 (which may be a redundant pair of controllers) as well as one or more process control system input/output (I/O) devices 28, 30 and 32, while the node 20 is illustrated as including a process controller 26 (which may be a redundant pair of controllers) as well as one or more process control system I/O devices 34 and 36. Each of the process control system I/O devices 28, 30, 32, 34 and 36 is communicatively connected to a set of process control related field devices, illustrated in FIG. 1 as field devices 40 and 42. The process controllers 24 and 26, the I/O devices 28-36 and the controller field devices 40 and 42 generally make up the process control system 12 of FIG. 1.

One or more of the field devices 40, 42, 60, and 62 may be actuators for a device such as a valve, and may be responsive to commands received from the controller to which it is coupled (e.g., configured to actuate a valve to open or close the valve in response to commands from a controller). Likewise, one or more of the field devices 40, 42, 60, and 62 may be transmitters that are configured to detect a measurement (e.g., flow, temperature, pressure, etc.) via a sensor and transmit the measurements to a controller. One or more of the field devices may be "smart" field devices, configured to transmit one or more "secondary" variable values other than a primary process variable the field device is configured to drive or measure. For example, in a HART implementation, the primary variable may be transmitted or received by the field device via a 4-20 mA signal, and the one or more secondary variables may be transmitted or received via a digital signal superimposed on the 4-20 mA signal.

Generally speaking, a "field device variable" is a variable internal to the field device that it is configured to detect (e.g., via a sensor measurement or via a calculation) or set (e.g., in response to a message received from a controller). In a typical implementation, the relevant process control system or safety system of which the field device variable is a part includes one or more process variables mapped to the field device variables (e.g., via the configuration system 80). More broadly, when a "device variable" is discussed with reference to a particular device, this generally refers to a variable detected, calculated, set, updated, etc. by the particular device.

The node 18 includes one or more safety system logic solvers 50, 52, while the node 20 includes safety system logic solvers 54 and 56. Each of the logic solvers 50-56 is an I/O device having a processor 57 that executes safety logic modules 58 stored in a memory and is communicatively connected to provide control signals to and/or receive signals from safety system field devices 60 and 62.

Generally speaking, as used herein the phrase "memory" or "memory device" refers to a system or device including computer-readable media or medium ("CRM"). "CRM" refers to a medium or media accessible by the relevant computing system for placing, keeping, or retrieving information (e.g., data, computer-readable instructions, program modules, applications, routines, etc). Note, "CRM" refers to media that is non-transitory in nature, and does not refer to disembodied transitory signals, such as radio waves. CRM of the described memories may be implemented in any technology, device, or group of devices included in the relevant computing system or in communication with the relevant computing system. CRM of the described memories may include volatile or nonvolatile media, and removable or non-removable media.

In any event, each of the nodes 18 and 20 includes at least one message propagation device (MPD) 70 or 72, which are communicatively coupled to each other via a ring type bus connection 74. The safety system logic solvers 50-56, the safety system field devices 60 and 62, the MPDs 70 and 72 and the bus 74 generally make up the safety system 14 of FIG. 1.

In some embodiments, the safety system field devices 60 and 62 may be field devices designed specifically for safety system implementation and not typical process control operation. On the other hand, in some embodiments, the safety system field devices 40 and 60 may be field devices capable of implementation in a typical process control system (e.g., the system 12), and may simultaneously function as field devices in both the process control system 12 and the safety system 14, for example. In such an embodiment, however, the field device would likely need to meet the heightened standards typically required for implementation in a safety system (e.g., with regard to heightened demands for verifiable integrity of data transmitted and received by the devices). As a result, the disclosed variable-by-variable data integrity verification techniques disclosed herein may be especially useful in a safety system such as the safety system 14.

The process controllers 24 and 26, which may be, by way of example only, DeltaV™ controllers sold by Emerson Process Management, or any other desired type of process controllers are programmed to provide process control functionality (using what are commonly referred to as control modules) using the I/O devices 28, 30 and 32 (for the controller 24), the I/O devices 34 and 36 (for the controller 26) and the field devices 40 and 42. In particular, each of the controllers 24 and 26 implements or oversees one or more process control routines stored therein or otherwise associated therewith and communicates with the field devices 40 and 42 and the workstations 14 to control the process 10 or a portion of the process 10 in any desired manner. The field devices 40 and 42 may be any desired types of field devices, such as sensors, valves, transmitters, positioners, etc., and may conform to any desired open, proprietary or other communication or programming protocol including, for example, the HART or the 4-20 ma protocol (as illustrated for the field devices 40), any fieldbus protocol such as the Foundation Fieldbus protocol (as illustrated for the field devices 42), or the CAN, Profibus, the AS-Interface protocols, to name but a few. Similarly, the I/O devices 28-36 may be any known types of process control I/O devices using any appropriate communication protocol(s). Generally speaking, the process controllers implement control of the controlled process by implementing a control routine (part of a larger control strategy for controlling a process) to determine one or more controller output values (i.e., commands transmitted by the controller) to drive one or more process inputs (i.e., manipulated variables, such as a control valve position, that are responsive to the controller commands) to drive a process output (i.e., a controlled variable such as a temperature, flow rate, etc.) to a desired value (i.e., a setpoint) based on one or more measured process inputs (e.g., measured temperatures, flows, pressures, etc.) received at the controller as controller inputs.

The safety logic solvers 50-56 of FIG. 1 may be any desired type of safety system control devices including a processor 57 and a memory that stores safety logic modules or routines 58 adapted to be executed on the processor 57 to provide control functionality associated with the safety system 14 using the field devices 60 and 62. The logic implemented by the logic solvers to implement safe control of the controlled process may be referred to as a "safety scheme" or a "safety system scheme." The safety scheme may involve commanding one or more of the field devices 40, 42, 60, or 62 to transition to a safe state (e.g., by actuating an associated valve to drive it to a safe state) based on one or more unsafe conditions detected based on an evaluation of one or more process variable values (e.g., sensor measurements, diagnostic indices, etc.) and the logic of the safety scheme. The nature of a safe state generally depends on the particular nature of the process and field device in question. For example, if a tank is at risk of overflowing, a logic solver may drive an inlet valve to a safe state by closing the valve (thereby preventing more liquid from entering the tank). By contrast, the logic solver may drive an outlet valve to a safe state by opening the outlet valve (thereby draining the tank). In other words, in this particular example, the safe state for the inlet valve may be 0% open and the safe state for the outlet valve may be 100% open.

Of course, the safety field devices 60 and 62 may be any desired type of field devices conforming to or using any known or desired communication protocol, such as those mentioned above. In particular, the field devices 60 and 62 may be safety-related field devices of the type that are conventionally controlled by a separate, dedicated safety-related control system. In the process plant 10 illustrated in FIG. 1, the safety field devices 60 are depicted as using a dedicated or point-to-point communication protocol, such as the HART or the 4-20 ma protocol, while the safety field devices 62 are illustrated as using a bus communication protocol, such as a Fieldbus protocol. However, as noted, in an embodiment, the safety field devices 60 and 62 may be typical field devices capable of deployment and use in both the process control system 12 and the safety system 14.

A common backplane 76 (indicated by a dotted line through the controllers 24, 26, the I/O devices 28-36, the safety logic solvers 50-56 and the MPDs 70 and 72) is used in each of the nodes 18 and 20 to connect the controllers 24 and 26 to the process control I/O cards 28, 30 and 32 or 34 and 36, as well as to the safety logic solvers 52, 54 or 56 and 58 and to the MPDs 70 or 72. The controllers 24 and 26 are also communicatively coupled to, and operate as a bus arbitrator for the bus 22, to enable each of the I/O devices 28-36, the logic solvers 52-56 and the MPDs 70 and 72 to communicate with any of the workstations 16 via the bus 22.

As will be understood, each of the workstations 16 includes a processor 77 and a memory 78 that stores one or more configuration and/or viewing applications adapted to be executed on the processor 78.

A configuration application 80 and a viewing application 82 are illustrated in an exploded view in FIG. 1 as being stored in one of the workstations 14. However, if desired, these applications could be stored and executed in different ones of the workstations 14 or in other computers associated with the process plant 10. Generally speaking, the configuration application 80 provides configuration information to a configuration engineer and enables the configuration engineer to configure some or all elements of the process plant 10 and to store that configuration in the configuration database 21. As part of the configuration activities performed by the configuration application 80, the configuration engineer may create control routines or control modules for the process controllers 24 and 26, may create safety logic modules for any and all of the safety logic solvers 50-56 and may download these different control and safety modules to the appropriate ones of the process controllers 24 and 26 and the safety logic solvers 50-56 via the bus 22 and controllers 24 and 26. Similarly, the configuration application 80 may be used to create and download other programs and logic to the I/O devices 28-36, any of the field devices 40, 42, 60 and 62, etc.

The configuration application 80 include or may otherwise have access to a configuration database that stores data and other information that specifically identifies or addresses the various devices or components and their interconnections that are planned for or desired to be implemented on the process plant floor or field environment. As an example, the configuration database may store a number of logical identifiers of components in the field environment, enabling the controllers in and other devices to reference the components and signals associated with the components by way of the logical identifiers. For example, for a given field device, the configuration database may store information mapping or binding a logical identifier to a particular hardware address or I/O channel. The hardware address may identify a particular controller, a particular I/O card connected to the particular controller, or a particular address for the I/O channel connecting the particular I/O card to the field device. In some instances, this mapping or binding may be stored at the controller, the user interface device, the operator workstation, or any other desired device (e.g., any device needing to resolve the logical identifier).

After a logical identifier has been bound to a hardware address or I/O channel, the identifier is considered "assigned." In some cases, the system 10 includes "unassigned" logical identifiers, which are identifiers that a software element (e.g., a control routine or a function block) references but that has no binding. That is, a logical identifier is considered "unassigned" when the system 10 and the configuration database have no hardware address or I/O channel that has been bound to the tag. Thus, when an unassigned logical identifier is referenced by a control routine, no value carried by a signal in the plant 10 will be read and no command will be transmitted via a signal to a field device in the plant 10.

Example logical identifiers include Device Tags (DTs), each of which represents a particular instrument, controller, valve, or other physical field device (e.g., the field device 60A); and Device Signal Tags (DSTs), each of which represents a particular signal that is received or generated by a particular device and that typically corresponds to a particular parameter utilized by the field device (e.g., a command received by the field device 60A from the controller 52 or a measurement transmitted by the field device 60A to the controller 52). For some devices, a DST comprises a combination of a device's DT and an identifier of a specific signal received or generated by that device, e.g., an identifier of a specific parameter referenced by a control module. For some devices, typically legacy or dumb devices, a DT represents both the physical device and a signal generated by the device. Generally speaking, a device's logical identifier is used by the process plant 10 in both the field environment and in the back-end environment to uniquely identify the device. The DTs and DSTs may be referred to as "system tags" or "system identifiers." The variables represented by the "system tags" may be referred to as "system variables."

In some instances, one or more smart field devices (e.g., one or more of the fields devices 40, 42, 60, or 62) also may store logical identifiers unique to the smart field devices 22. These logical identifiers may be distinct from the system tags utilized by the plant 10 to identify the field devices and their associated signals, and may be referred to as "source identifiers" "source tags." Source tags may or may not be stored at the configuration database mentioned above, depending on the implementation.

Generally speaking, the "field device variables" discussed herein are variables local to the described field devices. As an example, a smart field device may have a local "source tag" that uniquely identifies a field device variable local to the smart field device. If desired, the smart field device may be configured to transmit the field device variable value to a corresponding controller, which may then map the received value to a system tag intended to map to the source tag of interest. In some instances, the control system 10 may be configured such that one or more source tags of a field device are not mapped to a system tag (and thus the represented variable may not be integrated into and accounted for by the relevant process control system or safety system). Some source tags may be ignored by the process control system or safety system because the variable it represents may have little significance to the operational goals or the safety goals of the process control system or safety system.

The viewing application 82 may be used to provide one or more displays to a user, such as to a process control operator, a safety operator, etc., which includes information about the state of the process control system 12 and the safety system 14 either in separate views or in the same view, if so desired. For example, the viewing application 82 may be an alarm display application that receives and displays indications of alarms to an operator. Such an alarm display may receive and display alarms from both the process control system 12 and the safety system 14 in an integrated alarm display as the alarms from both systems 12 and 14 will be sent to the operator workstation 14 executing the alarm display application and will be recognizable as alarms from different devices. Likewise, an operator may deal with safety alarms displayed in an alarm banner in the same manner as process control alarms. For example, the operator or user may acknowledge safety alarms, turn off safety alarms, etc. using the alarm display, which will send messages to the appropriate process controller 24, 26 within the safety system 14 using communications over the bus 22 and the backplane 76 to take the corresponding action with respect to the safety alarm. In a similar manner, other viewing applications may display information or data from both the process control system 12 and the safety system 14 as these systems use the same types and kinds of parameters, security and referencing so that any data from one of the systems 12 and 14 can be integrated into a display or view traditionally provided for a process control system.

In any event, the applications 80 and 82 may send separate configuration and other signals to and may receive data from each process controllers 24 and 26 as well as from each of the safety system logic solvers 50-56. These signals may include process-level messages related to controlling the operational parameters of the process field devices 40 and 42, and may include safety-level messages related to controlling the operational parameters of the safety-related field devices 60 and 62. While the safety logic solvers 50-56 may be programmed to recognize both the process-level messages and the safety-level messages, the safety logic solvers 50-56 are capable of distinguishing between the two types of messages and will not be capable of being programmed or effected by process-level configuration signals. In one example, the programming messages sent to the process control system devices may include certain fields or addresses which are recognized by the safety system devices and which prevent those signals from being used to program the safety system devices.

If desired, the safety logic solvers 50-56 may employ the same or a different hardware or software design as compared to the hardware and software design used for the process control I/O cards 28-36. However, the use of alternate technologies for the devices within the process control system 12 and devices within the safety system 14 may minimize or eliminate common cause hardware or software failures.

Furthermore, the safety system devices, including the logic solvers 50-56 may employ any desired isolation and security techniques to reduce or eliminate the chances of unauthorized changes being made to the safety-related functions implemented thereby. For example, the safety logic solvers 50-56 and the configuration application 80 may require a person with a particular authority level or a person located at a particular workstation to make changes to the safety modules within the logic solvers 50-56, with this authority level or location being different from the authority or access level or location needed to make changes to the process control functions performed by the controllers 24 and 26 and the I/O devices 28-36. In this case, only those persons designated within the safety software or located at workstations authorized to make changes to the safety system 14 have authorization to alter safety-related functions, which minimizes the chances of corruption to the operation of the safety system 14. As will be understood, to implement such security, the processors within the safety logic solvers 50-56 assess the incoming messages for proper form and security and operate as gatekeepers on changes being made to the safety-level control modules 58 executed within the safety logic solvers 50-56.

Furthermore, if desired, once safety-related functions are enabled within the logic solvers 50-56, no change of status to the safety functions can be made via the operator workstations 14 without proper access rights, which enables the communication structure associated with the process control system 12 to be used to provide initialization for the safety system 14 and to be used to provide run-time reporting of the operation of the safety system 14, but to still isolate the process control system 12 from the safety system 14 in the sense that changes to the process control system 12 cannot impact the operation of the safety system 14.

As will be understood, the use of the backplane 76 in each of the nodes 18 and 20 enables the safety logic solvers 50 and 52 and the safety logic solvers 54 and 56 to communicate locally with one other to coordinate safety functions implemented by each of these devices, to communicate data to one another, or to perform other integrated functions. On the other hand, the MPDs 70 and 72 operate to enable portions of the safety system 14 that are disposed at vastly different locations of the plant 10 to still communicate with one another to provide coordinated safety operation at different nodes of the process plant 10. In particular, the MPDs 70 and 72 in conjunction with the bus 74 enable the safety logic solvers associated with different nodes 18 and 20 of the process plant 10 to be communicatively cascaded together to allow for the cascading of safety-related functions within the process plant 10 according to an assigned priority. Alternatively, two or more safety-related functions at different locations within the process plant 10 may be interlocked or interconnected without having to run a dedicated line to individual safety field devices within the separate areas or node of the plant 10. In other words, the use of the MPDs 70 and 72 and the bus 74 enables a configuration engineer to design and configure a safety system 14 that is distributed in nature throughout the process plant 10 but that has different components thereof communicatively interconnected to enable the disparate safety related hardware to communicate with each other as required. This feature also provides scalability of the safety system 14 in that it enables additional safety logic solvers to be added to the safety system 14 as they are needed or as new process control nodes are added to the process plant 10.

B. Example Field Device and Controller

Figure 2:
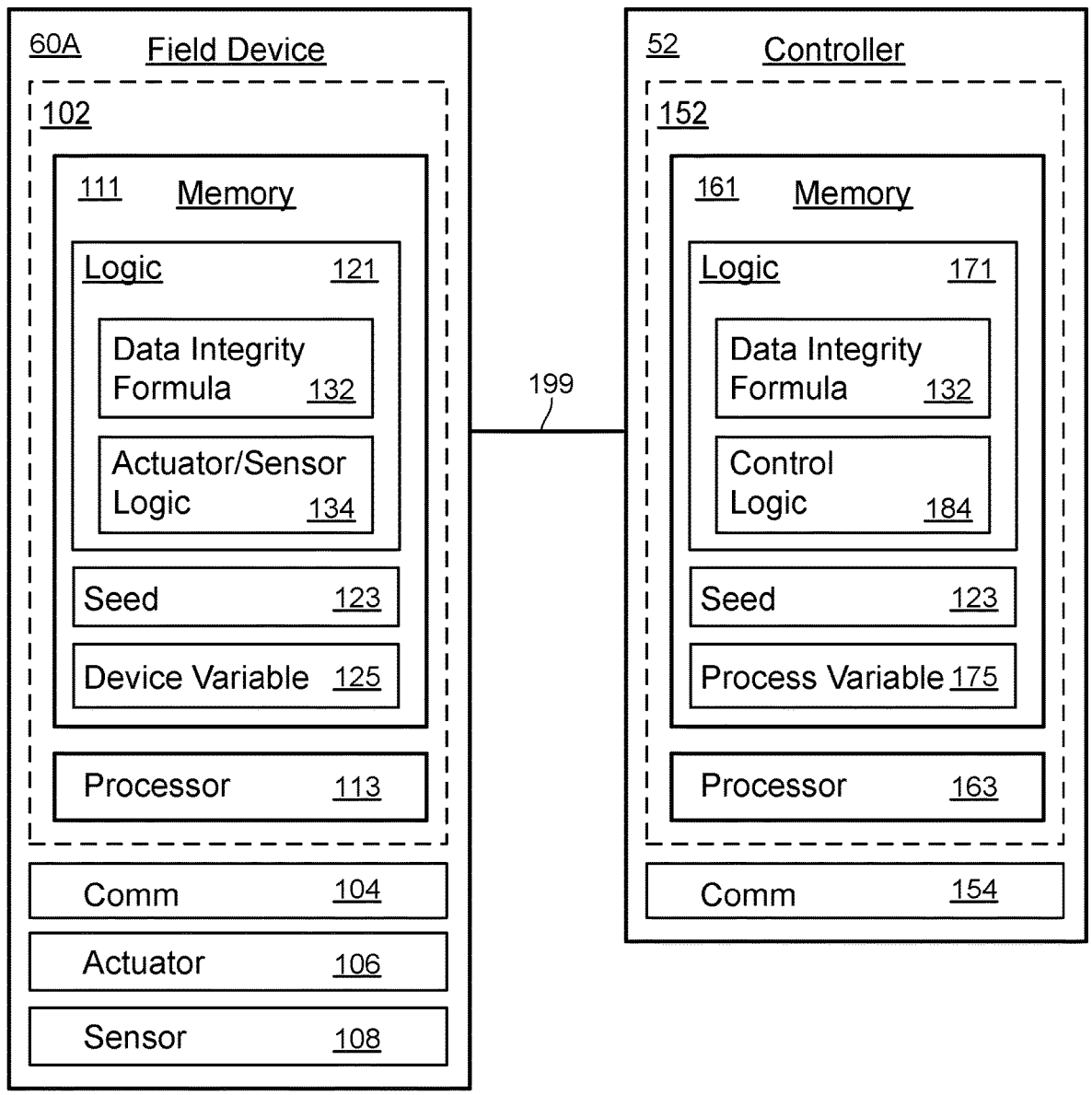
FIG. 2 is a block diagram of an example field device and an example controller that may communicate in accordance with the described techniques.

FIG. 2 is a block diagram depicting example components of the field device 60A and the controller 52 (also shown in FIG. 1), communicatively coupled via a link 199 if the I/O network 1 shown in FIG. 1, each of which may be configured to transmit and receive messages including variable values in a manner that enables the receiving device to verify the integrity of the received values on a variable-by-variable basis.

Unless otherwise stated, a "communication link" or a "link" is a pathway or medium connecting two or more nodes. A link may be a physical link or a logical link. A physical link is the interface or medium(s) over which information is transferred, and may be wired or wireless in nature. Example physicals links include (i) wired links such as cables with a conductor for transmission of electrical energy or a fiber optic connection for transmission of light and (ii) wireless links such as wireless electromagnetic signals that carry information via changes made to one or more properties of electromagnetic waves. A logical link between two or more nodes represents an abstraction of the underlying physical links or intermediary nodes connecting the two or more nodes. For example, two or more nodes may be logically coupled via a logical link. The logical link may be established via any combination of physical links and intermediary nodes (e.g., routers, switches, or other networking equipment).

As shown, the field device 60A includes a set of circuits 102, a communication interface 104 for coupling the field device 60A to the controller 52 via the link 199, an actuator 106 (e.g., for actuating a valve), and/or a sensor (e.g., for detecting or measuring a process variable value, such as a pressure, flow rate, tank level, temperature, etc.). The set of circuits 102 includes a processor 113 coupled to a memory 111. The memory 111 may include logic or instructions 121 that, when executed by the processor 113, causes the field device to perform one or more of the functions described herein (e.g., those described with reference to FIGS. 6 and 7). Specifically, the logic 121 may include a data integrity formula 132 for calculating a data integrity check and actuator/sensor logic 134. The memory 111 may also include a seed 123 and a device variable 125 (which may be any suitable variable that is detected, via the sensor 108 or via calculation by the processor 113, by the field device 60A).

Further, the controller 52 includes a set of circuits 152 and a communication interface 154 for (i) coupling the controller 52 to the field device 60A via the link 199, and (ii) coupling the controller 52 to the communication network 22. The set of circuits 152 includes a processor 163 and a memory 161, which includes logic or instructions 171 that, when executed by the processor 163, causes the controller 52 to perform one or more of the functions described herein (e.g., those described with reference to FIGS. 6 and 7). The memory 152 includes the same data integrity formula 132 and the same seed 123 used by the field device 60A, enabling the controller 52 to calculate data integrity checks for the values received from the field device 60A. The controller 52 includes a process variable 175 that corresponds to or maps to the device variable 125.

In operation, the field device 60A implements the logic 134 to perform a control function with respect to the actuator 106 (e.g., actuating a valve in response to a command from the controller 52) and/or a sensor 108 (e.g., detecting a process variable value via the sensor 108 and transmitting the value to the controller 52). Further, the field device 60A may implement the data integrity formula 132 to generate a data integrity check for the device variable 125 by inputting to the formula 132 the value of the variable 125 and the seed 123. The seed 123 may be any relatively unique information known to the field device 160 and the intended recipients of the message (e.g., the controller 52). In some instances, the data integrity check may be calculated using additional inputs, such as a sequence parameter that is updated every time the variable 125 is updated, a variable status parameter indicating a status of the variable 125, etc.

When transmitting the value of the device variable 125 via a message to the controller 52, the field device 60A may include the calculated data integrity check to enable the controller 52 to verify the integrity of the received value. Generally speaking, the controller 52 (or any desired recipient) is configured to recalculate the data integrity check based on the known seed 123 (also known to the controller 52) and the value included in the received message. The formula 132 is constructed such that any change to any of the inputs will result in a different data integrity check. Thus, if the value of the variable 125 (or the sequence parameter or the variable status parameter, if utilized) somehow changed during transmission, the data integrity check calculated by the controller 52 will be different than the one received in the message, it will thus know that one of the inputs (e.g., the value of the variable 125) differs from what was transmitted.

Generally, the controller 52 updates the process variable 175 with the value of the device variable 125 received from the field device 60A in response to verifying the integrity of the received value. If the data integrity check calculated by the controller 52 does not match the received data integrity check, the controller 52 discards the received value rather than updating the process variable 175 with the received value. Depending on the embodiment, the process variable 175 may be a local variable or a system variable. Further, the controller 52 may include control logic 182 for implementing functions as part of a safety scheme (e.g., causing one or more field devices to enter a safe state in response to detecting unsafe conditions). Depending on the particular configuration, the control logic 182 may account for the value of the process variable 175 (and thus may depend on the device variable 125). Additional details regarding variable-by-variable data integrity checks are described below with reference to the methods shown in FIGS. 6 and 7.

If desired, the field device 60A may calculate and transmit a data integrity check for any of a desired number of variable values, and may transmit multiple data integrity checks for a single variable value if desired (e.g., wherein each is intended for a different recipient). Further, any suitable process control device may be configured to transmit variable values in a message that enables variable-by-variable verification of data integrity by implementing a data integrity formula such as the formula 132 and a seed such as the seed 123.

II. Example Protocols

Figure 3:
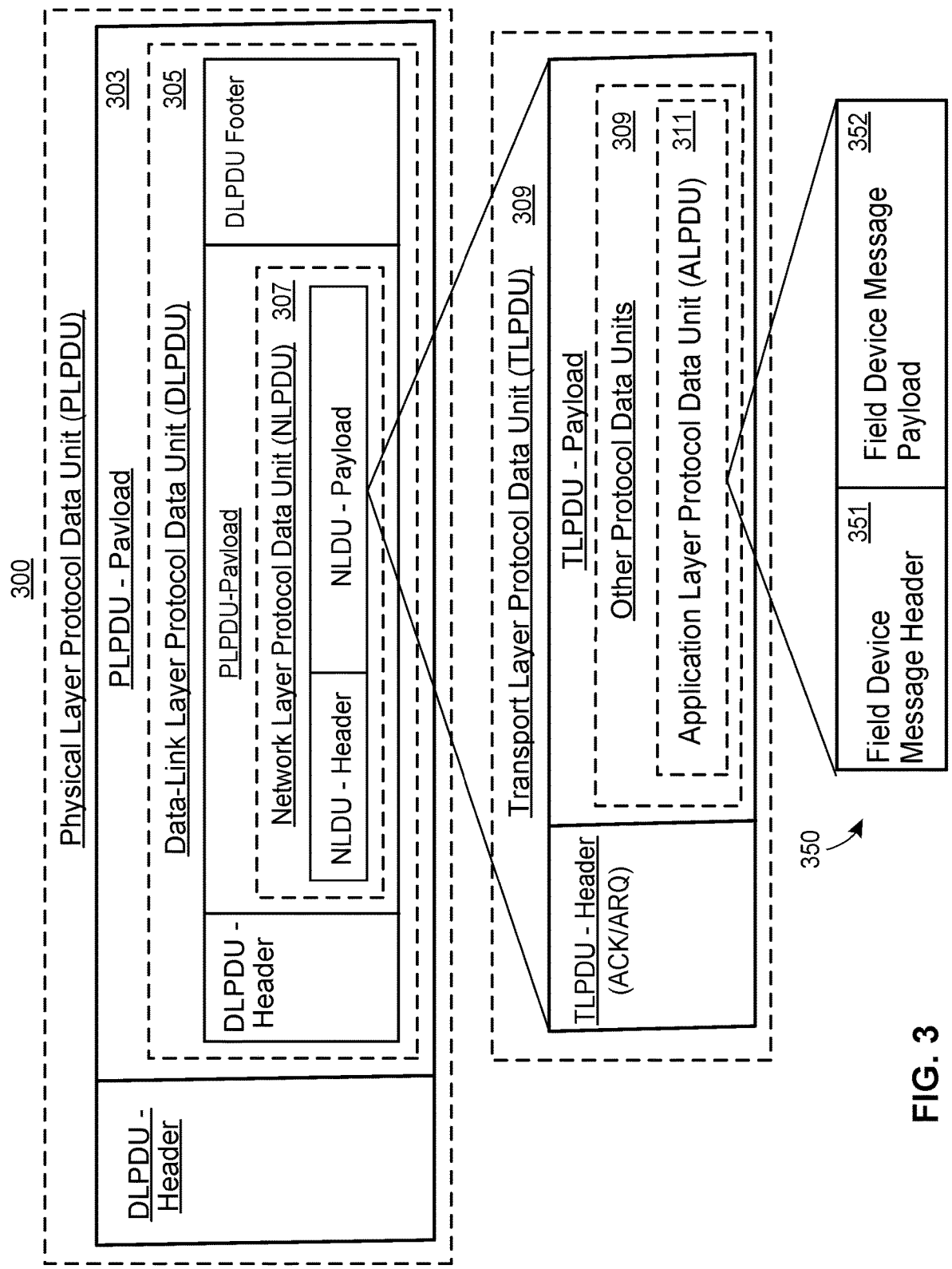
FIG. 3 depicts example layers of an example protocol stack that may be utilized by the process control devices described herein to transmit and receive device variable values in a manner that enables the receiving device to verify the integrity of the received values on a variable-by-variable basis.

FIG. 3 depicts example layers of an example protocol stack 300 that may be utilized by the process control devices described herein to transmit and receive device variable values in a manner that enables the receiving device to verify the integrity of the received values on a variable-by-variable basis.

The protocol stack 300 includes five layers: a physical layer 303; a data-link layer 305; a network layer 307; a transport layer 309; and an application layer 311. Protocols used by the described systems may include additional or alternative layers to those described. Each layer 303-311 of the protocol 300 may have a set of rules to which protocol data units (PDUs) or messages must conform in order for nodes on the network to properly understand the contents of the messages. PDUs at each layer may have a payload as well as metadata (e.g., contained in headers, footers, preambles, etc.). Generally speaking, the payload is the content or data of a PDU and the metadata is the "data about the data" (e.g., regarding formatting, sequencing, timing, destination and source addresses, communication handshakes, etc.).

Generally speaking, each of the layers 303-311 may be any suitable protocol found in the Internet protocol suite (e.g., TCP, UDP, IP, etc.) or any suitable protocol or standard found in typical process control communication protocols, such as HART, HART-IP, WirelessHART, Ethernet/IP, Fieldbus, ControlNet, etc. In an embodiment, the messages described herein conform to the HART protocol at the application layer 311, wherein standard HART commands, responses, and formatting are used. In an embodiment, the described messages may conform to other protocols such as Open Platform Communications United Architecture ("OPC UA"), a machine to machine communication protocol for industrial automation. The ALPDU may be transmitted via any suitable NLDU.

III. Example Message Payloads

Figure 4:
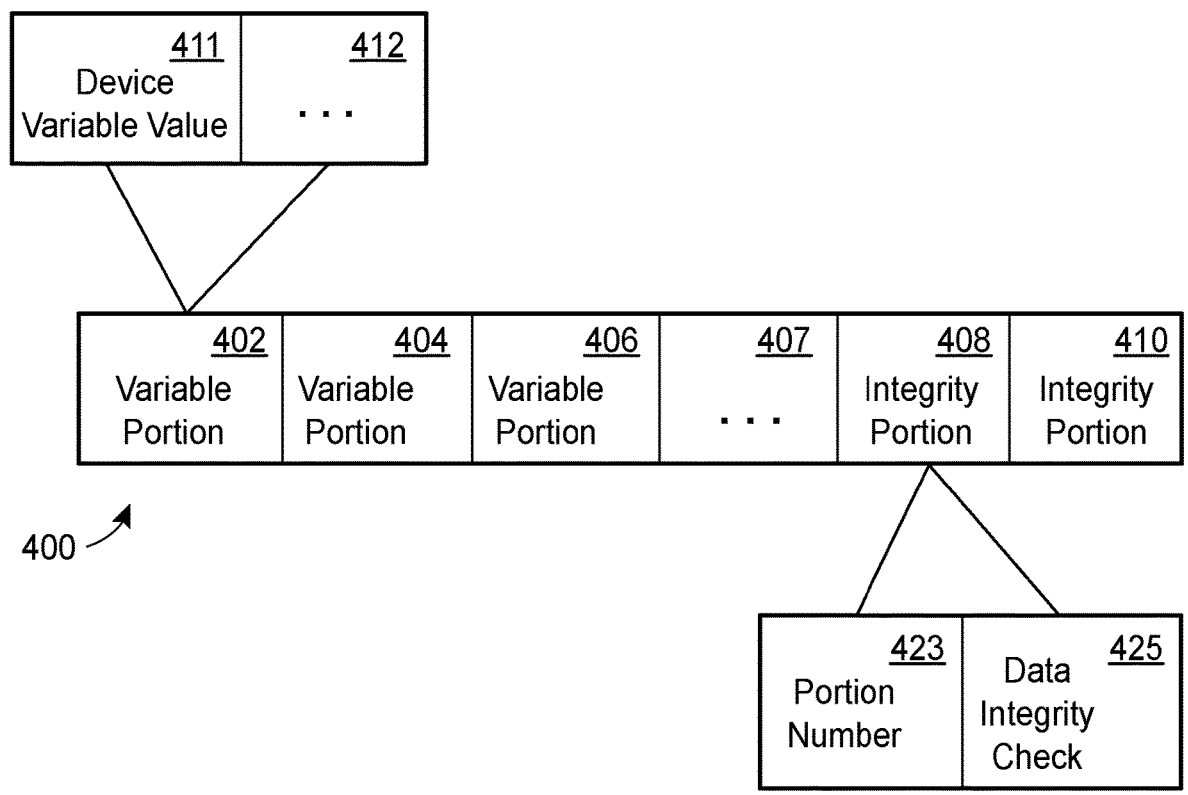
FIG. 4 depicts an example message payload that may include one or more variable values or candidate values having corresponding data integrity checks to enable a receiving device to verify the integrity of the included values on a variable-by-variable basis.
Figure 5:
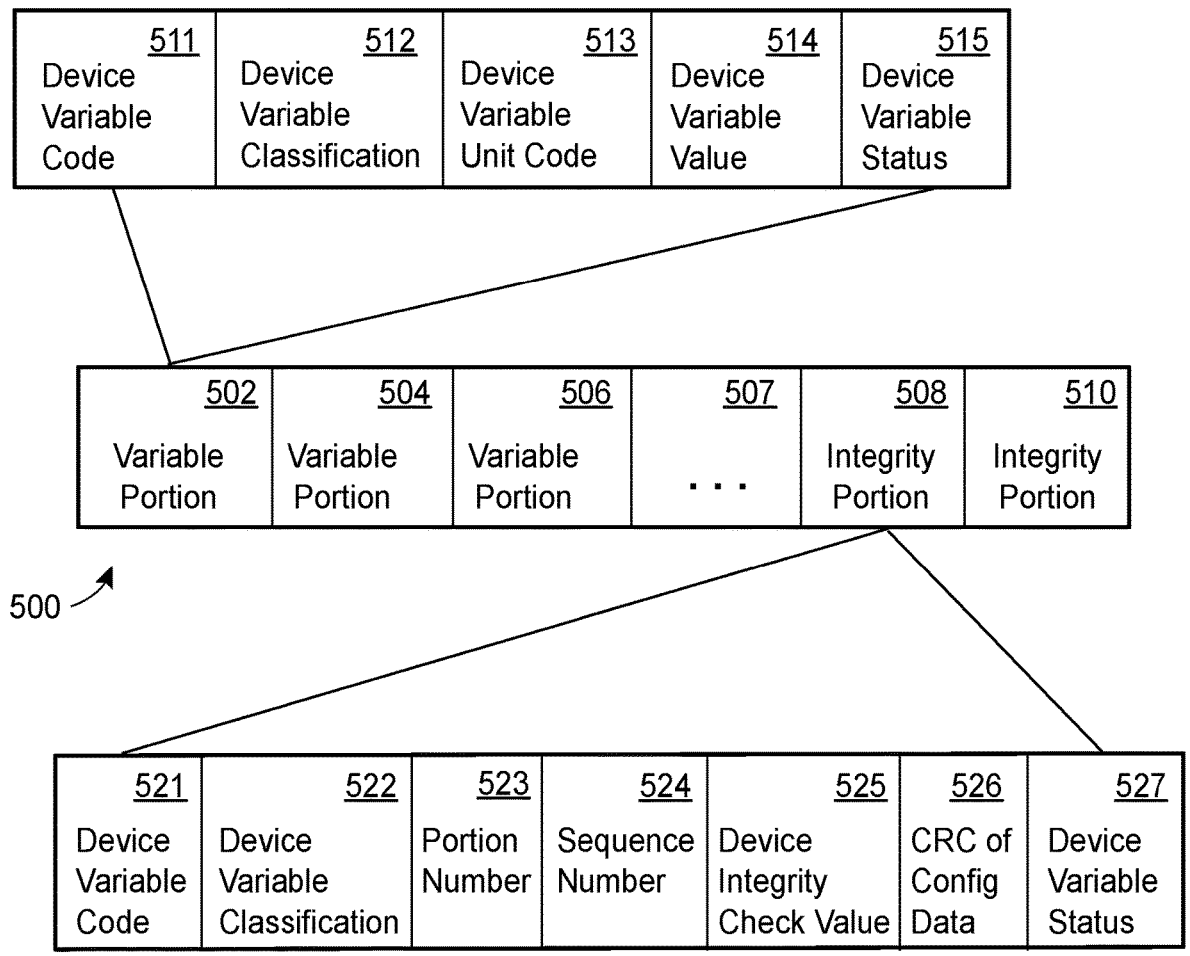
FIG. 5 depicts an additional example message payload that may include one or more variable values or candidate values having corresponding data integrity checks to enable a receiving device to verify the integrity of the included values on a variable-by-variable basis.

FIGS. 4 and 5 depict example message payloads 400 and 500, each representing an example of the message payload 352 shown in FIG. 3, and each including one or more variable values having corresponding data integrity checks to enable a receiving device to verify the integrity of the included values on a variable-by-variable basis. Any one or more of the process control devices shown in FIG. 1 may be configured to transmit or receive messages including payloads formatted in a manner similar to the payloads 400 and 500.

The payload 400 includes message portions 402-410. Generally speaking, the variable portions 402-406 are "variable portions" each particular to a particular variable and configured to carry a value for that particular variable. For example, the variable portion 402 includes a device variable value 411 (e.g., a value for the device variable 125 shown in FIG. 2). If desired, the portion 402 may include other data relevant to the variable.

The integrity portions 408 and 410 include data integrity checks corresponding to the values carried in the variable portions. Each of the portions 408 and 410 may include a parameter indicating the variable portion to which the data integrity check corresponds. For example, the integrity portion 408 includes a data integrity check 425 and a parameter 423 identifying the message portion to which the data integrity check 421 corresponds. For example, referencing FIG. 2, the data integrity check 425 may be a value calculated via the data integrity formula 132, using the value 411 and the seed 123 as inputs. The portion parameter 423 may include a value "402" (or any other suitable ID that identifies the portion 402 or value 411) indicating that the check 421 in the portion 408 corresponds to the portion 402 (and thus to the value 411).

Likewise, the integrity portion 410 may include a data integrity check (not shown) and a parameter indicating a portion to which it corresponds. Fore example, the integrity portion 410 may correspond to the variable portion 406 or to the variable portion 402 (e.g., when the value 411 is intended to be received by two different recipients each of the portions 408/410 corresponds to a different recipient.

Moving to FIG. 5, the portions 502-510 correspond to the portions 402-410 shown in FIG. 4. Likewise, the device variable value 514 corresponds to the value 411; the data integrity check 525 corresponds to the data integrity check 425; and the portion parameter 523 corresponds to the portion parameter 423.

However, the portions 502-510 include additional data not necessarily included in the portions 402-410 of the payload 400. For example, the variable portion 502 includes (i) a device variable code 511 including a value unique to the variable in question (e.g., uniquely identifying the variable 125 shown in FIG. 2); (ii) a device variable classification 512 including a value unique to a variable type (e.g., process variable; integrity variable; etc.); (iii) a device variable unit code 513 including a value unique to the units corresponding to the variable in question (e.g., Fahrenheit, Celsius, Kelvin, etc.); and (iv) a device variable status 515 including a value indicating a status for the value 514 (e.g., good or reliable, bad or unreliable; unknown; etc.).

Further, the integrity portion 508 may include data relevant to the data integrity check 525. For example, it may include: (i) a device variable code 521 including a value unique to the data integrity check in question; (ii) a device variable classification 522 including a value unique to a variable type (e.g., indicating that the variable in question is a data integrity check); (iii) a portion 523 identifying the message portion to which the data integrity check 525 corresponds; (iv) a sequence parameter 524 that is incremented each time the value 514 is updated; (v) a data integrity check 526, such as a CRC, of configuration data included in the portion 502 (i.e., the relevant portion) and in the portion 508; and (vi) a device variable status indicating the status or reliability of the data integrity check 525. The data integrity check 526 of configuration data may ensure that the check 525 is for the information intended. For example, consider a situation in which the configuration was changed from Deg C to Deg F, or thermocouple type was changed. Depending on the embodiment, this change may not captured by the check 525 of the value 514. Thus, the check 526 may capture changes to metadata associated with the variable value 411/514, for example.

Figure 6:
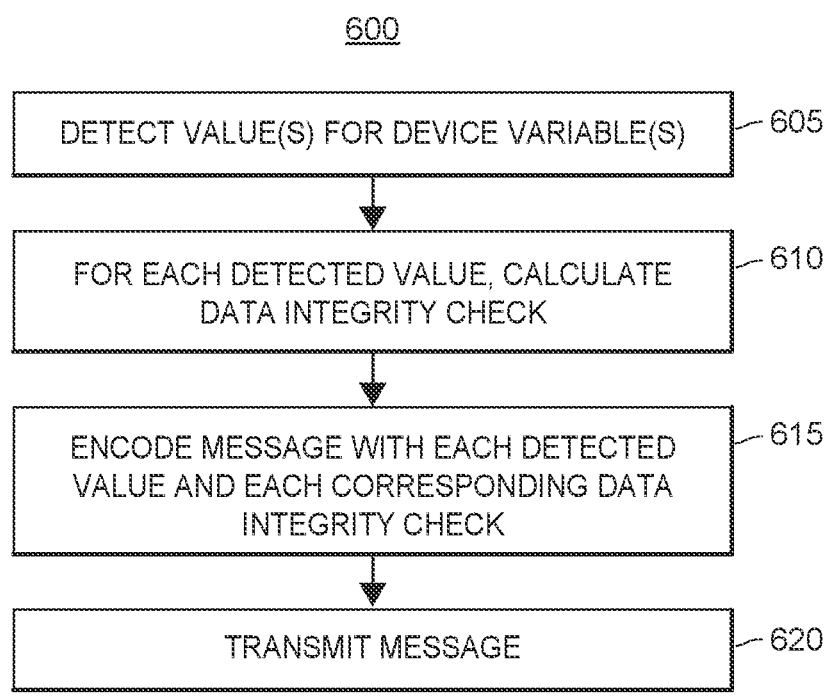
FIG. 6 depicts an example method for transmitting messages including variable values in a manner that enables a receiving device to verify the integrity of the received values on a variable-by-variable basis.

IV. An Example Method for Transmitting Messages that Enable Data Integrity Checks at the Variable Level FIG. 6 depicts an example method for transmitting messages including variable values in a manner that enables a receiving device to verify the integrity of the received values on a variable-by-variable basis. The method 600 may be implemented, in whole or in part, by any one or more of suitable process control devices such as those shown in FIGS. 1 and 2 (e.g., the controllers 24, 26, 50, 52, 54, or 56; or the field devices 40, 42, 60, or 62), and may be implemented via a set of circuits (e.g., of the field device 60A) that is permanently or semi-permanently configured to perform the method 600. In an embodiment, the method 600 may be embodied by a set of instructions or routines that are stored to memory and executable by a processor to implement the functionality of the method 600. Note, while the discussion below may reference the structure shown in FIGS. 1 and 2, appreciate that the method 600 may be implemented by any suitable process control device configured to transmit messages including process variable values and variable-by-variable data integrity checks such as those described herein.

The method 600 begins with a step 605, at which a first process control device (e.g., the field device 60A) detects a value for a device variable. The value may be detected via a sensor measurement (e.g., flow, temperature, pressure, viscosity, level, light, sound, etc.) or via a calculation. An example of a value detected via calculation is a diagnostic parameter pertaining to the health of the first process control device or to a device it actuates (e.g., a valve) or uses for measurements (e.g., a sensor).

At a step 610, the first process control device (e.g., the field device 60A) calculates a data integrity check for each detected value for which improved data integrity is desired. The data integrity check may be any suitable error detection code for verifying data integrity, such as a cyclic redundancy check (CRC), a checksum, or a hash.

If desired, some of the detected values may have no corresponding data integrity check. The data integrity check may be calculated via the data integrity formula 132 shown in FIG. 1B. Generally speaking, to calculate the data integrity check, the first process control device uses the detected value and a seed as inputs to the formula 132. The seed may be any suitable seed known to the first process control device and the intended receiving device (e.g., the controller 52). In an embodiment, the seed is sufficiently unique to enable detection of a masquerade.

For example, the seed may be some combination of: a device tag used by the process control system 12 and/or safety system 14 for the field device 60A; a device tag for the intended controller 52; a serial number of the field device 60A; a serial number for the controller 52; a hardware address (e.g., a MAC address) of the field device 60A; a hardware address of the controller 52; a site ID for the process control environment 10; a randomly generated unique value; or some combination thereof. In an example embodiment, the seed is a combination of a device tag for the field device 60A and a serial number for the field device 60A.

In an embodiment, the first process control device includes a sequence parameter for each detected value that is updated each time the respective value is updated. If desired, this sequence parameter may be used as an input for the data integrity formula.

In an embodiment, the first process control device generates a variable status for each detected value indicating the relative reliability of value (e.g., good, bad, unknown, etc.). If desired, this variable status may be used as an input for the data integrity formula.

If desired, the first process control device may calculate multiple data integrity checks for each detected value. This may be useful when multiple other process control devices receive and rely on the detected value (e.g., because the detected value carried in the message may become corrupted by the time the message reaches one device via a first communication path, but may be uncorrupted when receives at another device via a second communication path). Further, this may be useful if one desires a second seed for a second consumer of the data (e.g., a higher level system with which one does not want to share the seed for security reasons).

At a step 615, the first process control device (e.g., the field device 60A) encodes a message with each detected value and each corresponding data integrity check (assuming one exists). The message may be encoded to according to formats such as those of the messages 400 and 500 in FIGS. 4 and 5. The message may be encoded to include each input used for calculating the data integrity calculations. Thus, in embodiments where the data integrity formula is calculated for a given variable based on the variable value, the variable's sequence number, the variable's status, and the seed, the message may include the variable value, the sequence number, and the variable status for the given variable.

For example, the message may include a payload having a plurality of portions each corresponding to a different variable (e.g., see portions 402-406 shown in FIG. 4). For each value having a data integrity check, the message may then include an additional portion corresponding to the data integrity check (e.g., see portions 408 and 410 shown in FIG. 4).

To illustrate, the message may include a first, second, and third portion corresponding to a first, second, and third variable, respectively. If data integrity checks are desired for the first and third variables but not the second (for example), the message may also include fourth and fifth portions including data integrity checks for the first variable (e.g., in the fourth portion) and a data integrity check for the third variable (e.g., in the fifth portion).

The message may include a means for determining variable values or message portions to which the integrity portions and data integrity checks correspond. For example, each integrity portion in the message may include a "Portion Number" parameter that indicates the position within the message of the portion carrying the corresponding variable value. To illustrate, if the integrity portion 408 corresponds to the variable value in the portion 402, the parameter 422 may be set to "402." If the message includes multiple data integrity checks for a single detected value, multiple integrity portions may include a "portion number" parameter identifying the same variable value portion.

In some embodiments, up to eight portions may be expected per message and the "portion number" in the integrity portions may be set to 0-7 to indicate the variable portion to which it corresponds. If desired, the variable and integrity portions may be encoded with additional and/or alternative information, such as that discussed with reference to FIG. 5.

At a step 620, the first process control device (e.g., the field device 60A) transmits the message such that the message is receivable by a second process control device (e.g., one of the controllers 50-56 or 24/26, one of the field devices 40/42/60/62, the workstation 16, a historian, etc.). Depending on the embodiment, the first process control device may transmit the message via a wired or wireless link. Generally speaking, the second process control device is a device configured to implement a function as part of a control scheme for the process controlled in the process control environment (e.g., the plant 10). The control scheme may be a safety system scheme (e.g., implemented via the safety system 14) responsible for maintaining safe operation of the equipment in the environment (e.g., responsible for driving one or more process control devices in the environment in response to detecting unstable or otherwise potentially dangerous conditions). In an embodiment, the control scheme is a process control scheme or strategy (e.g., implemented via the process control system 12) for controlling the process to achieve a control objective (e.g., produce a desired product or chemical such as ethanol, generate power, etc.). While the safety system scheme may be characterized as a "passive" system that only intervenes when potentially unsafe conditions arise, the process control system is typically more active, continually reacting to process conditions and attempting to drive various aspects of the process to desired states in order to achieve the desired objective.

The first and second process control devices may be configured to transmit and receive the message via a publish/subscribe model (e.g., where the first device regularly transmits the message without prompting from the second device) or to transmit the message according to a request/response message (e.g., wherein the first device transmits the message in response to a request from the second device). In an embodiment, the first and second process control devices are each configurable to implement either the request/respond model or the publish/subscribed model, as desired.

The first and second process control devices may be configured to transmit and receive the message according to any suitable protocol that may be implemented in a process control environment, assuming such protocols can accommodate, or can be modified to accommodate, the variable-by-variable data integrity checks described herein. Example protocols that may be utilized by the first and second process control devices include HART, HART-IP, WirelessHART, Profibus, FOUNDATION™ Fieldbus, Ethernet/IP, ControlNet, DeviceNet, Modbus, OPC UA, etc.

In some instances, the method 600 is implemented at a rate proportional to a scan cycle (e.g., every scan cycle, every other scan cycle, etc.). Generally speaking, a scan cycle occurs during every scan time (which may any desired time, such 1 ms, 100 ms, 1 second, etc.). The scan cycle, generally speaking, is a cycle during which the relevant controller gathers inputs, runs a control algorithm, and updates outputs accordingly. Accordingly, in instances when the controller 52 is configured to implement a scan cycle during a given scan time, the field device 60A may be configured to implement the method 600 at rate equal to the scan rate or at a faster rate (e.g., at a harmonic period relative to the scan time) (e.g., thereby providing the most up-to-date field device variable values to the controller 52).

In some instances, the method 600 is implemented each time a change is detected in a relevant field device variable (e.g., a variable for which the field device 60A is configured to transmit values).

If desired, the method 600 may be implemented by any suitable device for the purpose of transmitting a message including variable value(s) in a manner than enables verification of data integrity on a variable-by-variable basis. For example, in some instances, a controller (e.g., the logic solver 50-56 or the process controller 24/26), a workstation (remote or local to the process control environment 10), a historian, a device in an Asset Management System (AMS), a network device, or any other desired device that might be implemented in a process control environment may implement the method 600 to transmit messages that enable verification of data integrity on a variable-by-variable basis; as a result, any such process control device may implement the functionality described above as being performed by the field device 60A, in an embodiment. Likewise, the second process control device (i.e., the recipient of the transmitted message) may be any of these devices.

Figure 7:
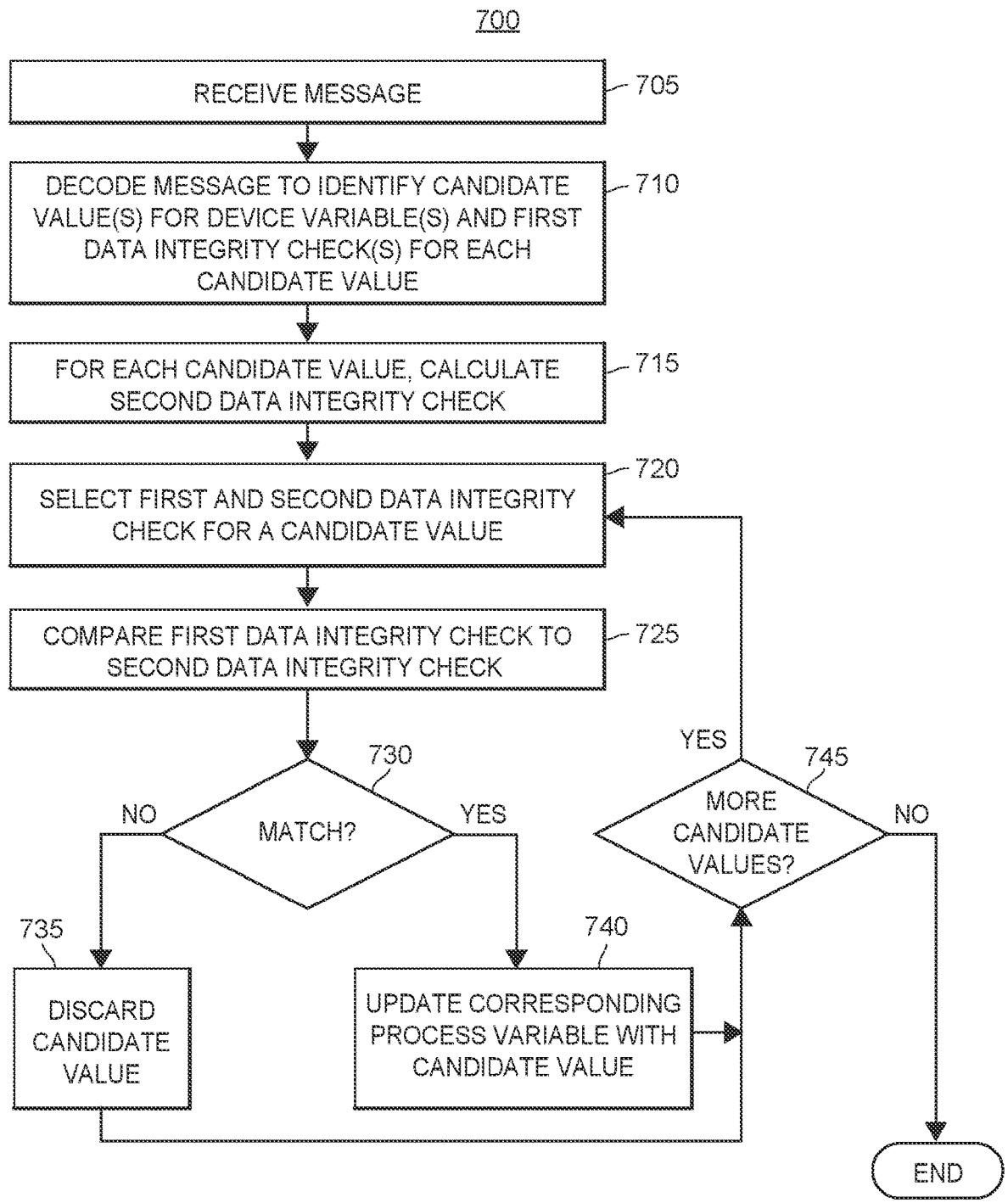
FIG. 7 depicts an example method 700 for receiving messages including variable values in a manner that enables verification of the integrity of the received values on a variable-by-variable basis.

V. An Example Method for Receiving Messages that Enable Data Integrity Checks at the Variable Level FIG. 7 depicts an example method 700 for receiving messages including variable values in a manner that enables verification of the integrity of the received values on a variable-by-variable basis. The method 700 may be implemented, in whole or in part, by any one or more of suitable process control devices such as those shown in FIGS. 1 and 2 (e.g., the controllers 24, 26, 50, 52, 54, or 56; or the field devices 40, 42, 60, or 62), and may be implemented via a set of circuits (e.g., the controller 52) that is permanently or semi-permanently configured to perform the method 700. In an embodiment, the method 700 may be embodied by a set of instructions or routines that are stored to memory and executable by a processor to implement the functionality of the method 700. Note, while the discussion below describes the method 700 with reference to the structure shown in FIGS. 1 and 2, appreciate that the method 600 may be implemented by any suitable process control device configured to receive messages including process variable values and variable-by-variable data integrity checks such as those described herein.

The method 700 may be implemented to handle a message, transmitted by a first process control device, that includes process variable value(s) and variable-by-variable data integrity check(s). Specifically, the method 700 may be implemented by a second process control device, such as the controller 52 shown in FIGS. 1 and 2.

The method begins at a step 705 with the second process control device (e.g., the controller 52) receiving the message from the first process control device (e.g., the field device 60A). In some instances, the second process control device may receive the message from any suitable device (field device or otherwise) that is configured to transmit messages in a manner that enables variable-by-variable verification of data integrity in a manner consistent with the described techniques. The message may be received via a wired or wireless link.

At a step 710, the second process control device (e.g., the controller 52) decodes the received message to identify (i) candidate value(s) for device variables and (ii) data integrity check(s) for each of the candidate values. In some instances, the message may include variable values for which no data check exists. That is, if desired, the message may include some combination of field device values having a data integrity check and field device values having no data integrity check.

Further, in some instances, the message may include multiple data integrity checks for a given candidate value (e.g., wherein each data integrity check is intended for a different recipient of the message). In such instances, the second process control device must determine which data integrity check corresponds to the given candidate value. In some embodiments, the second process control device is preconfigured to assume that one of the data integrity checks is assigned to it (e.g., the data integrity check for the second process control device may always be in the same relative position or portion of the message). In some embodiments, the message includes a parameter for each of the data integrity checks to identify the receiving device to which it corresponds (e.g., a parameter for each data integrity check that identifies the intended receiving device's tag, serial number, unique identifier, IP address, etc.).

In decoding the message, the second process control device (e.g., the controller 52) may analyze the message to determine which portions of the message are variable portions (i.e., portions carrying a device variable value) and which portions are integrity portions (i.e., portions carrying data integrity checks for the device variable values). To that end, each portion of the message may include a parameter or field indicating its type (e.g., a device variable code, indicating that a portion is a variable portion, an integrity portion, etc.). The second process control device then analyzes the integrity portions to determine the variable portions to which the integrity portions correspond. This may involve analyzing a "portion number" parameter in each integrity portion that indicates the portion in the message to which the integrity portion corresponds.

At a step 715, the second process control device (e.g., the controller 52) calculates a second data integrity check for the candidate values. For example, referencing FIGS. 2 and 4, the controller 52 may identify a candidate value 411 in portion 402 and a corresponding data integrity check 421 in the portion 408. It may then calculate a second data integrity check using the value 411 and a predetermined seed as inputs to the formula 132. It may then permanently or temporarily store the second integrity check. Similarly, the second process control device may calculate a second data integrity check for each of the other data integrity checks included in the message.

At a step 720, the second process control device (e.g., the controller 52) selects first and second data integrity checks, for a given candidate value, to be compared. For example, sticking with the previous example, the controller 52 may select the value 411 and the data integrity check 421 corresponding to the value 411.

At a step 725, the second process control device (e.g., the controller 52) compares the first and second data integrity checks. For example, for the value 411, the controller 52 may compare the received data integrity check 421 to the data integrity check calculated by the controller 52 using the value 411 and the seed as inputs. If the value 411 has not changed since the data integrity check 421, the first and second data integrity checks should match. If the value 411 has changed (or if the sequence number has changed in embodiments that use the sequence number to calculate integrity checks), the first and second integrity checks will not match.

At a step 730, the second process control device (e.g., the controller 52) proceeds to a step 740 if the first and second data integrity checks match (indicating the candidate value has not changed from when the first data integrity check was calculated, and thus indicating the received candidate value is the detected value the field device 60A intended to send) and to a step 735 if they do not (indicating the value 411 is somehow different than the original value transmitted by the field device 60A).

At the step 735, in response to determining that a data integrity check mismatch exists, the second process control device (e.g., the controller 52) discards the given candidate value corresponding to the first and second data integrity checks. That is, it proceeds without updating the corresponding process variable with the value 411. The second process control device and the larger control system or safety system may continue operation with the assumption that the value of the variable in question is whatever value it had prior to receiving the message. In some instances, the second process control device may generate an alarm (e.g., via a workstation) in response to detecting that a mismatch exists (or in response to receiving a certain number of mismatches over the course of a particular time period or over the course of a certain number of messages). In some instances, the second process control device may determine that it is too risky to for operation to proceed in such a condition, and may transmit a message to the first field device (e.g., the field device 60A) to cause it to enter a safe state (e.g., by causing a valve to open or close).

At the step 740, in response to determining that a data integrity check match exists, the second process control device (e.g., the controller 52) updates a process variable corresponding to the field device variable with the candidate value.

For example, prior to implementing the method 700, a valve CV001 may have a position of 25% open. In the received message, the variable in question may be a valve position for CV001, and the candidate value in the message may be 50% open (indicating the valve position has changed). In response to detecting a data integrity mismatch, the controller 52 may discard the candidate value and, e.g., continue operation under the assumption that the valve is still 25% open, that the valve position is unknown, etc.

However, in response to verifying the integrity of the received value, the controller 52 may update a system variable representing the valve position to be 50%. Accordingly, the controller 52, the control system 12, and/or the safety system 14 may operate (e.g., implement control routines) based on this updated control valve position. In some embodiments, the updated process variable is a system variable accessible by components of the control system 12 and/or safety system 14. In some embodiments, the updated process variable is a local variable at the controller 52.

At a step 745, the second process control device (e.g., the controller 52) determines whether or not the received message includes additional candidate values for which data integrity checks have not been analyzed at the steps 725 and 730. If additional candidate values exist in the message, the controller proceeds to the step 720; otherwise it proceeds to the step 750. For example, referencing FIG. 4, the controller 52 may determine that the variable portion 406 of the message 400 also has an integrity portion (e.g., portion 408). As a result, the controller 52 may proceed to the step 720 to analyze the integrity of the value included in the variable portion 406.

At the step 750, the second process control device (e.g., the controller 52) finishes analyzing the received message and proceeds to a next task (e.g., handling a new message received during a future scan).

In some instances, the controller 52 (or any other device implementing the method 700) is configured to implement a scan cycle at the beginning of a predetermined scan period or time. In such instances, the method 600 is implemented every scan cycle by the controller 52. Note, the method 600 may be implemented by any suitable device configured to receive messages and to verify the integrity of the included variable values on a variable-by-variable basis. For example, in some instances a smart field device may implement the method 600.

Further, as discussed with reference to FIG. 6, the first and second process control devices may be configured to transmit and receive the message via a subscribe/publish model (e.g., where the first device regularly transmits the message without prompting from the second device) or to transmit the message according to a request/response message (e.g., wherein the first device transmits the message in response to a request from the second device). In an embodiment, the first and second process control devices are each configurable to implement either the request/respond model or the publish/subscribed model, as desired. Additionally, as noted with reference to FIG. 6, the first and second process control devices may be configured to transmit and receive the message according to any suitable protocol that may be implemented in a process control environment, assuming such protocols can accommodate, or can be modified to accommodate, the variable-by-variable data integrity checks described herein.

VI. Additional Considerations

In an embodiment, the residual error for a single message portion (sometimes referred to as a SLOT) may be calculated. Depending on the embodiment, the following assumptions may be (but are not necessarily) used: restriction that the data path for communications use shielded twisted pair limits the worst-case bit error rate to 10-4; 0x9eb2 16-bit CRC (CRC-16-DNP) polynomial has a Hamming Distance of 6 for messages less than 135 bits (or 16 bytes); even bit errors of more than Hamming distance are negligible contribution to result (odd errors are detected); dataword is 6 bytes–48 bits (Float+Status+Seq Number); codeword is 8 Bytes–64 bits (Dataword+2 Bytes CRC); probability of a 6-bit error in 64-bit codeword is 7.45408-17 for given BER. Under these assumptions, for the 0x9eb2 16-bit CRC polynomial, there may be 2051 possible 6-bit errors for the Dataword size. Under such assumptions, the probability of undetected 6-bit error is 2.83214-24. Assuming a transfer rate of 40 Hz, a PFH may equal 4.07828-19.

In some embodiments, implementation of the described systems may include both a secure network connection and user-based or role-based authorization. HART-IP, for example, supports establishing a secure connection using TLS and DTLS. Role-based authorization may be desirable because the 'user' may be a controller or safety application. In some embodiments, the described system may be implemented without user/role-based authorization.

Descriptions of various aspects, apparatuses, systems, components, devices, methods, and techniques for managing discrete process control elements (e.g., discrete devices, discrete communication channels, discrete signals, etc.) and for smart commissioning discrete elements in the control system 5 follow.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Referencing the methods 600 and 700 specifically, the described functions may be implemented, in whole or in part, by the devices, circuits, or routines of the system 10 shown in FIGS. 1 and 2. Each of the described methods may be embodied by a set of circuits that are permanently or semi-permanently configured (e.g., an ASIC or FPGA) to perform logical functions of the respective method or that are at least temporarily configured (e.g., one or more processors and a set instructions or routines, representing the logical functions, saved to a memory) to perform the logical functions of the respective method.

Throughout this specification, plural instances may implement components, operations, or structures described as a single instance. Although individual operations of one or more methods are illustrated and described as separate operations, one or more of the individual operations may be performed concurrently in certain embodiments.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Further, the phrase "wherein the system includes at least one of X, Y, or Z" means the system includes an X, a Y, a Z, or some combination thereof. Similarly, the phrase "wherein the component is configured for X, Y, or Z" means that the component is configured for X, configured for Y, configured for Z, or configured for some combination of X, Y, and Z.

In addition, use of the "a" or "an" are employed to describe elements and components of the embodiments herein. This description, and the claims that follow, should be read to include one or at least one. The singular also includes the plural unless it is obvious that it is meant otherwise.

In various embodiments, hardware systems described herein may be implemented mechanically or electronically. For example, a hardware system may comprise dedicated circuitry or logic that is permanently configured (e.g., as a special-purpose processor, such as a field programmable gate array (FPGA) or an application-specific integrated circuit (ASIC) to perform certain operations). A hardware system may also comprise programmable logic or circuitry (e.g., as encompassed within a general-purpose processor or other programmable processor) that is temporarily configured by software to perform certain operations. It will be appreciated that the decision to implement a hardware system mechanically, in dedicated and permanently configured circuitry, or in temporarily configured circuitry (e.g., configured by software) may be driven by cost and time considerations.

What is claimed is:

1. A method for transmitting messages including values for device variables such that the integrity of the values can be verified on a variable-by-variable basis, the method comprising
    detecting, by a first process control device in a process control environment for controlling a process, a detected value for a device variable;
    calculating, by the first process control device, a first data integrity check by way of a performing a data integrity calculation using the detected value and a seed as inputs;
    encoding a message to include the detected value and the first data integrity check for the detected value; and
    transmitting the message so that it is receivable by a second process control device configured to: (i) receive the message, (ii) calculate a second data integrity check for a candidate value in the message for the device variable; (iii) update or not update, at the second process control device, a process variable mapped to the device variable with the candidate value based on whether or not the first and second data integrity checks match; and (iv) implement a function as part of a control scheme for the process in accordance with the process variable.

2. The method of claim 1, wherein the second process control device is a field device.

3. The method of claim 1, wherein the second process control device is a controller.

4. The method of claim 3, wherein the controller a logic solver for a safety system, and wherein the control scheme is a safety system scheme for determining when to drive one or more field devices, coupled to the logic solver, to a safe state.

5. The method of claim 3, wherein the controller is a process controller for a process control system configured to control the process, and wherein the control scheme is a process control scheme for the process control system.

6. The method of claim 1, wherein the first process control device is a field device and the device variable is a field device variable.

7. The method of claim 1, wherein the first process control device is a controller.

8. The method of claim 1, wherein the message is encoded to include multiple detected values each having a data integrity check, wherein the method further comprises:
   detecting a second detected value for a second device variable;
   calculating a third data integrity check by way of performing the data integrity calculation using the second detected value and the seed as inputs;
   wherein encoding the message further includes encoding the message to include the second detected value and the second data integrity check for the second detected value; and
   wherein the second process control device is further configured to:
   (i) calculate a fourth data integrity check for a second candidate value in the message for the second device variable;
   (ii) update or not update, at the second process control device, a second process variable mapped to the second device variable with the second candidate value based on whether or not the third and fourth data integrity checks match; and
   (iii) implement a function as part of a control scheme for the process in accordance with the second process variable.

9. The method of claim 8, wherein the encoding the message comprises encoding the message such that the message includes a plurality of message portions including:
   a first message portion includes the first detected value;
   a second message portion includes the second detected value;
   a third message portion includes the first data integrity check and a parameter indicating to which of the plurality of message portions the first data integrity check corresponds;
   a fourth message portion includes the third data integrity check and a parameter indicating to which of the plurality of message portions the third data integrity check corresponds.

10. The method of claim 1, further comprising:
    incrementing a sequence parameter to indicate an update to the device variable, wherein the sequence parameter is configured to be updated every time the device variable is updated;
    wherein calculating the first data integrity check further includes using the sequence parameter as one of the inputs for the data integrity calculation;
    wherein encoding the message further includes encoding the message to include the sequence parameter.

11. The method of claim 10, further comprising:
    detecting a variable status for the device variable;
    wherein calculating the first data integrity check further includes using the variable status as one of the inputs for the data integrity calculation;
    wherein encoding the message further includes encoding the message to include the variable status.

12. The method of claim 1, wherein the first process control device is configured to calculate a third data integrity checks for the detected value such that a third process control device receiving the message can verify the integrity of the detected value via the third data integrity check, wherein the method further comprises:
    calculating, by the first process control device, the third data integrity check by way of a performing the data integrity calculation using the detected value and a second seed as inputs;
    wherein encoding the message further includes encoding the message to include the third data integrity check for the detected value; and
    wherein transmitting the message includes transmitting the message so that it is receivable by the third process control device, wherein the third process control device is configured to: (i) receive the message, (ii) calculate a fourth data integrity check for the candidate value in the message; and (iii) update or not update, at the third process control device, a process variable mapped to the device variable with the candidate value based on whether or not the third and fourth data integrity checks match.

13. The method of claim 1, wherein the seed is a value formed by combining a serial number of the first process control device and a tag of the first process control device, wherein the tag is an identifier by which the first process control device is addressable by one or more other devices in the process control environment.

14. A system for transmitting messages including values for process variables that can be authenticated at the parameter level, the system comprising:
    a first process control device configured to be communicatively coupled to one or more other process control devices in an input/output (I/O) network of a process control environment for controlling a process, the first process control device including:
    (A) a communication interface configured to couple the field device to the one or more controllers; and
    (B) a set of circuits communicatively coupled to the communication interface and configured to:
    detect a detected value for a device variable;
    calculate a first data integrity check by way of performing a data integrity calculation using the detected value and a seed as inputs;
    encode a message to include the detected value and the first data integrity check for the detected value; and
    transmit, via the communication interface, the message to a second process control device that is configured to: (i) receive the message, (ii) calculate a second data integrity check for a candidate value in the message for the device variable; (iii) update or not update, at the second process control device, a process variable mapped to the device variable with the candidate value based on whether or not the first and second data integrity checks match; and (iv) implement a function as part of a control scheme for the process in accordance with the process variable.

15. The system of claim 14, wherein the second process control device is a controller.

16. The system of claim 14, wherein the first process control device is a field device and the device variable is a field device variable.

17. The system of claim 14, wherein the message is encoded to included multiple detected values each having a data integrity check, wherein the set of circuits is further configured to:
    detect a second detected value for a second device variable;

calculate a third data integrity check by way of performing the data integrity calculation using the second detected value and the seed as inputs;
wherein encoding the message further includes encoding the message to include the second detected value and the second data integrity check for the second detected value; and
wherein the second process control device is further configured to:
(i) calculate a fourth data integrity check for a second candidate value in the message for the second device variable;
(ii) update or not update, at the second process control device, a second process variable mapped to the second device variable with the second candidate value based on whether or not the third and fourth data integrity checks match; and
(iii) implement a function as part of a control scheme for the process in accordance with the second process variable.

18. The system of claim 17, wherein the set of circuits are further configured to encode the message such that the message includes a plurality of message portions including:
a first message portion includes the first detected value;
a second message portion includes the second detected value;
a third message portion includes the first data integrity check and a parameter indicating to which of the plurality of message portions the first data integrity check corresponds;
a fourth message portion includes the third data integrity check and a parameter indicating to which of the plurality of message portions the third data integrity check corresponds.

19. The system of claim 14, wherein the set of circuits is further configured to:
increment a sequence parameter to indicate an update to the device variable, wherein the sequence parameter is configured to be updated every time the device variable is updated;
wherein calculating the first data integrity check further includes using the sequence parameter as one of the inputs for the data integrity calculation;
wherein encoding the message further includes encoding the message to include the sequence parameter.

20. The system of claim 19, wherein the set of circuits is further configured to:
detect a variable status for the device variable;
wherein calculating the first data integrity check further includes using the variable status as one of the inputs for the data integrity calculation;
wherein encoding the message further includes encoding the message to include the variable status.

21. The system of claim 14, wherein the set of circuits is configured to calculate multiple data integrity checks for the detected value for different recipients of the message such that a third process control device receiving the message receives a third data integrity check, wherein the set of circuits is configured to
calculate a third data integrity check by way of a performing the data integrity calculation using the detected value and a second seed as inputs;
wherein encoding the message further includes encoding the message to include the third data integrity check for the detected value; and
wherein transmitting the message includes transmitting the message so that it is receivable by the third process control device, wherein the third process control device is configured to: (i) receive the message, (ii) calculate a fourth data integrity check for the candidate value in the message; and (iii) update or not update, at the third process control device, a process variable mapped to the device variable with the candidate value based on whether or not the third and fourth data integrity checks match.

22. The system of claim 14, wherein the seed is a value formed by combining a serial number of the first process control device and a tag of the first process control device, wherein the tag is an identifier by which the first process control device is addressable by one or more other devices in the process control environment.

23. A method for verifying the integrity of device variable values included in a message from a process control device, the method comprising
receiving a message, transmitted by a first process control device, at a second process control device in a process control environment for controlling a process;
decoding the message to identify within the message: (i) a candidate value for a device variable, and (ii) a first data integrity check for the device variable;
calculating a second data integrity check by way of a performing a second data integrity calculation using the candidate value and a seed as inputs;
comparing the second data integrity check to the first data integrity check to determine whether or not the second data integrity check matches the first data integrity check and to thereby determine whether or not the candidate value matches a detected value that was used to calculate the first data integrity check;
responding to determining that the second data integrity check does not match the first data integrity check by discarding the candidate value such that a process variable mapped to the device variable maintains a prior value;
responding to determining that the second data integrity check matches the first data integrity check by updating, at the second process control device, the process variable with the candidate value; and
implementing, in accordance with the process variable, a function as part of a control scheme for the process.

24. The method of claim 23, wherein the second process control device is a controller.

25. The method of claim 24, wherein the controller a logic solver for a safety system, and wherein the control scheme is a safety system scheme for determining when to drive one or more field devices, coupled to the logic solver, to a safe state.

26. The method of claim 23, wherein device variable is a first device variable and wherein the decoding the message comprises decoding the message to identify within the message:
a first message portion including the candidate value for the first device variable;
a second message portion including a candidate value for a second device variable;
a third message portion including (i) the first data integrity check and (ii) a parameter indicating to which of the plurality of message portions the first data integrity check corresponds; and
a fourth message portion including (i) a third data integrity check for the candidate value for the second device variable; and (ii) a parameter indicating to which of the plurality of message portions the third data integrity check corresponds.

27. The method of claim 23, wherein decoding the message further comprises:
 identifying a sequence parameter configured to be updated every time the device variable is updated; and
 wherein calculating the second data integrity check further includes using the sequence parameter as one of the inputs for the data integrity calculation.

28. The method of claim 23, wherein the seed is a value including a serial number of the first process control device.

29. A system for verifying the integrity of device variable values included in a message from a process control device, the system comprising:
 a second process control device configured to be communicatively coupled to a first process control device in a process control environment, the second process control device including:
 (A) a communication interface configured to communicatively couple the second process control device to the first process control device; and
 (B) a set of circuits communicatively coupled to the communication interface and configured to:
  receive, via the communication interface, a message transmitted by the first process control device;
  decode the message to identify within the message: (i) a candidate value for a device variable, and (ii) a first data integrity check for the device variable;
  calculate a second data integrity check by way of a performing a second data integrity calculation using the candidate value and a seed as inputs;
  compare the second data integrity check to the first data integrity check to determine whether or not the second data integrity check matches the first data integrity check and to thereby determine whether or not the candidate value matches a detected value that was used to calculate the first data integrity check;
  respond to determining that the second data integrity check does not match the first data integrity check by discarding the candidate value such that a process variable mapped to the device variable maintains a prior value;
  respond to determining that the second data integrity check matches the first data integrity check by updating the process variable with the candidate value; and
  implement, in accordance with the process variable, a function as part of a control scheme for the process.

30. The system of claim 29, wherein the second process control device is a controller.

31. The system of claim 30, wherein the controller is a process controller for a process control system configured to control the process, and wherein the control scheme is a process control scheme for the process control system.

32. The system of claim 29, wherein device variable is a first device variable and wherein the decoding the message comprises decoding the message to identify within the message:
 a first message portion including the candidate value for the first device variable;
 a second message portion including a candidate value for a second device variable;
 a third message portion including (i) the first data integrity check and (ii) a parameter indicating to which of the plurality of message portions the first data integrity check corresponds; and
 a fourth message portion including (i) a third data integrity check for the candidate value for the second device variable; and (ii) a parameter indicating to which of the plurality of message portions the third data integrity check corresponds.

33. The system of claim 29, wherein the set of circuits are further configured to:
 identify a sequence parameter configured to be updated every time the device variable is updated; and
 wherein calculating the second data integrity check further includes using the sequence parameter as one of the inputs for the data integrity calculation.

34. The system of claim 29, wherein the seed is a value including a serial number of the first process control device.

* * * * *